US009842145B2

(12) United States Patent
Cort et al.

(10) Patent No.: US 9,842,145 B2
(45) Date of Patent: *Dec. 12, 2017

(54) PROVIDING PROFILE INFORMATION USING SERVERS

(71) Applicant: YAHOO HOLDINGS, INC., Sunnyvale, CA (US)

(72) Inventors: Frank J. Cort, Dublin, CA (US); Joshua Robert Russell Jacobson, San Francisco, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,886

(22) Filed: Dec. 3, 2013

(65) Prior Publication Data

US 2014/0095433 A1    Apr. 3, 2014

Related U.S. Application Data

(63) Continuation of application No. 12/875,982, filed on Sep. 3, 2010, now Pat. No. 9,020,938.

(Continued)

(51) Int. Cl.
  *G06F 17/30* (2006.01)
  *G06F 3/048* (2013.01)
  *H04L 29/08* (2006.01)

(52) U.S. Cl.
  CPC .......... *G06F 17/3053* (2013.01); *G06F 3/048* (2013.01); *G06F 17/30575* (2013.01); *H04L 67/1095* (2013.01)

(58) Field of Classification Search
  CPC .................. G06F 17/3053; G06F 17/30575
  (Continued)

(56) References Cited

U.S. PATENT DOCUMENTS 5,396,647 A   3/1995 Thompson et al.
5,610,915 A   3/1997 Elliott et al.
(Continued)

FOREIGN PATENT DOCUMENTS

CN   101351818   1/2009
DE   EP 0944002 A1 *   9/1999   ....... G06F 17/30867
(Continued)

OTHER PUBLICATIONS

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

(Continued)

*Primary Examiner* — Nargis Sultana
(74) *Attorney, Agent, or Firm* — James J. DeCarlo; Greenberg Traurig, LLP

(57) ABSTRACT

A method includes: generating profile data for users including a first user, the profile data related to contacts or persons used in messages to or from each user; generating, via a server platform, parameters corresponding to the profile data for ranking contacts or persons; and transmitting the parameters to client devices to allow each client device to determine ranks of contacts or persons in the profile data based on the parameters and a function that uses the parameters.

17 Claims, 16 Drawing Sheets

Related U.S. Application Data

(60) Provisional application No. 61/301,172, filed on Feb. 3, 2010.

(58) Field of Classification Search
USPC .................................. 707/732, 610; 709/248
See application file for complete search history.

(56) References Cited

U.S. PATENT DOCUMENTS

| | | | |
|---|---|---|---|
| 5,966,714 A * | 10/1999 | Huang | G06Q 10/107 |
| 6,020,884 A | 2/2000 | MacNaughton et al. | |
| 6,154,205 A | 11/2000 | Carroll et al. | |
| 6,285,999 B1 | 9/2001 | Page | |
| 6,385,644 B1 | 5/2002 | Devine et al. | |
| 6,405,197 B2 | 6/2002 | Gilmour | |
| 6,484,196 B1 | 11/2002 | Maurille | |
| 6,502,131 B1 | 12/2002 | Vaid et al. | |
| 6,510,453 B1 | 1/2003 | Apfel et al. | |
| 6,546,393 B1 | 4/2003 | Khan | |
| 6,560,620 B1 | 5/2003 | Ching | |
| 6,594,654 B1 * | 7/2003 | Salam | G06F 17/30861 |
| 6,606,744 B1 | 8/2003 | Mikurak | |
| 6,615,348 B1 | 9/2003 | Gibbs | |
| 6,721,748 B1 * | 4/2004 | Knight | G06F 17/30702 |
| 6,816,850 B2 | 11/2004 | Culliss | |
| 6,832,245 B1 * | 12/2004 | Isaacs | G06Q 10/107 |
| | | | 709/206 |
| 6,931,419 B1 * | 8/2005 | Lindquist | G06Q 10/109 |
| | | | 705/26.1 |
| 6,952,805 B1 | 10/2005 | Tafoya et al. | |
| 6,965,918 B1 | 11/2005 | Arnold et al. | |
| 6,996,777 B2 | 2/2006 | Hiipakka | |
| 7,003,724 B2 | 2/2006 | Newman | |
| 7,058,892 B1 | 6/2006 | MacNaughton et al. | |
| 7,076,533 B1 | 7/2006 | Knox et al. | |
| 7,085,745 B2 | 8/2006 | Klug | |
| 7,103,806 B1 | 9/2006 | Horvitz | |
| 7,149,985 B1 | 12/2006 | Crosby et al. | |
| 7,181,518 B1 | 2/2007 | Matsumoto et al. | |
| 7,185,065 B1 | 2/2007 | Holtzman et al. | |
| 7,237,009 B1 | 6/2007 | Fung et al. | |
| 7,246,045 B1 | 7/2007 | Rappaport et al. | |
| 7,289,614 B1 | 10/2007 | Twerdahl et al. | |
| 7,328,242 B1 | 2/2008 | McCarthy et al. | |
| 7,333,976 B1 | 2/2008 | Auerbach et al. | |
| 7,359,894 B1 | 4/2008 | Liebman et al. | |
| 7,383,307 B2 | 6/2008 | Kirkland et al. | |
| 7,444,323 B2 | 10/2008 | Martinez et al. | |
| 7,454,464 B2 | 11/2008 | Puthenkulam et al. | |
| 7,475,109 B1 | 1/2009 | Fletcher et al. | |
| 7,475,113 B2 | 1/2009 | Stolze | |
| 7,478,361 B2 | 1/2009 | Peteanu et al. | |
| 7,512,788 B2 | 3/2009 | Choi et al. | |
| 7,512,814 B2 | 3/2009 | Chen et al. | |
| 7,536,384 B2 * | 5/2009 | Venkataraman | G06F 17/30713 |
| 7,539,676 B2 * | 5/2009 | Aravamudan | G06F 3/0481 |
| 7,580,363 B2 | 8/2009 | Sorvari et al. | |
| 7,593,995 B1 * | 9/2009 | He | G06Q 10/107 |
| | | | 707/999.003 |
| 7,606,860 B2 | 10/2009 | Puthenkulam et al. | |
| 7,610,341 B2 | 10/2009 | Daniell | |
| 7,620,407 B1 | 11/2009 | Donald et al. | |
| 7,624,103 B2 | 11/2009 | Wiegering et al. | |
| 7,627,598 B1 * | 12/2009 | Burke | G06F 17/30864 |
| 7,634,463 B1 * | 12/2009 | Katragadda | G06Q 10/10 |
| | | | 701/431 |
| 7,639,157 B1 | 12/2009 | Whitley et al. | |
| 7,653,695 B2 | 1/2010 | Flury et al. | |
| 7,685,144 B1 | 3/2010 | Katragadda | |
| 7,692,653 B1 | 4/2010 | Petro et al. | |
| 7,698,140 B2 | 4/2010 | Bhardwaj et al. | |
| 7,702,730 B2 | 4/2010 | Spataro et al. | |
| 7,707,249 B2 | 4/2010 | Spataro et al. | |
| 7,707,509 B2 | 4/2010 | Naono et al. | |
| 7,716,140 B1 * | 5/2010 | Nielsen | G06F 21/6245 |
| | | | 705/319 |
| 7,720,916 B2 | 5/2010 | Fisher et al. | |
| 7,724,878 B2 | 5/2010 | Timmins et al. | |
| 7,725,492 B2 | 5/2010 | Sittig | |
| 7,730,010 B2 | 6/2010 | Kishore et al. | |
| 7,743,051 B1 | 6/2010 | Kashyap et al. | |
| 7,752,081 B2 | 7/2010 | Calabria | |
| 7,756,895 B1 | 7/2010 | Emigh | |
| 7,756,935 B2 | 7/2010 | Gaucas | |
| 7,761,436 B2 * | 7/2010 | Norton | G06F 17/30867 |
| | | | 707/705 |
| 7,788,260 B2 | 8/2010 | Lunt | |
| 7,805,492 B1 | 9/2010 | Thatcher et al. | |
| 7,818,396 B2 * | 10/2010 | Dolin | G06Q 30/02 |
| | | | 707/709 |
| 7,827,208 B2 | 11/2010 | Bosworth | |
| 7,827,265 B2 | 11/2010 | Cheever et al. | |
| 7,831,692 B2 | 11/2010 | French et al. | |
| 7,836,045 B2 * | 11/2010 | Schachter | G06F 17/30867 |
| | | | 707/713 |
| 7,836,132 B2 | 11/2010 | Qureshi et al. | |
| 7,836,134 B2 | 11/2010 | Pantalone | |
| 7,849,141 B1 * | 12/2010 | Bellegarda | G06Q 10/107 |
| | | | 707/665 |
| 7,849,142 B2 | 12/2010 | Clegg et al. | |
| 7,853,602 B2 | 12/2010 | Gorti et al. | |
| 7,853,881 B1 | 12/2010 | Aly Assal et al. | |
| 7,865,562 B2 | 1/2011 | Nesbitt et al. | |
| 7,870,197 B2 | 1/2011 | Lewis et al. | |
| 7,899,806 B2 | 3/2011 | Aravamudan | |
| 7,899,871 B1 | 3/2011 | Kumar et al. | |
| 7,908,647 B1 | 3/2011 | Polis et al. | |
| 7,925,690 B2 | 4/2011 | Smith et al. | |
| 7,930,430 B2 | 4/2011 | Thatcher et al. | |
| 7,949,611 B1 | 5/2011 | Nielsen et al. | |
| 7,949,627 B2 | 5/2011 | Aravamudan | |
| 7,970,832 B2 | 6/2011 | Perry, Jr. et al. | |
| 7,979,569 B2 | 7/2011 | Eisner et al. | |
| 7,991,764 B2 | 8/2011 | Rathod | |
| 7,996,456 B2 | 8/2011 | Gross | |
| 8,005,806 B2 * | 8/2011 | Rupp | G06F 17/30867 |
| | | | 707/705 |
| 8,028,032 B2 | 9/2011 | Laird-McConnell | |
| 8,055,715 B2 | 11/2011 | Bensky et al. | |
| 8,073,928 B2 | 12/2011 | Dolin et al. | |
| 8,086,676 B2 * | 12/2011 | Palahnuk | G06Q 30/00 |
| | | | 707/609 |
| 8,086,968 B2 | 12/2011 | McCaffrey et al. | |
| 8,112,437 B1 | 2/2012 | Katragadda et al. | |
| 8,140,566 B2 | 3/2012 | Boerries et al. | |
| 8,145,791 B2 | 3/2012 | Thatcher et al. | |
| 8,151,358 B1 | 4/2012 | Herold | |
| 8,161,122 B2 | 4/2012 | Sood et al. | |
| 8,200,761 B1 | 6/2012 | Tevanian | |
| 8,200,808 B2 | 6/2012 | Ishida | |
| 8,204,897 B1 * | 6/2012 | Djabarov | G06F 17/30705 |
| | | | 707/767 |
| 8,239,197 B2 | 8/2012 | Webb et al. | |
| 8,244,848 B1 | 8/2012 | Narayanan et al. | |
| 8,284,783 B1 | 10/2012 | Maufer et al. | |
| 8,291,019 B1 | 10/2012 | Rochelle et al. | |
| 8,296,179 B1 | 10/2012 | Rennison | |
| 8,316,315 B2 | 11/2012 | Portnoy et al. | |
| 8,363,803 B2 | 1/2013 | Gupta | |
| 8,365,235 B2 | 1/2013 | Hunt et al. | |
| 8,392,409 B1 | 3/2013 | Kashyap et al. | |
| 8,392,836 B1 * | 3/2013 | Bau | G06Q 10/107 |
| | | | 715/739 |
| 8,412,174 B2 | 4/2013 | Khosravi | |
| 8,423,545 B2 | 4/2013 | Cort et al. | |
| 8,433,762 B1 | 4/2013 | Wald et al. | |
| 8,443,441 B2 | 5/2013 | Stolfo et al. | |
| 8,452,745 B2 * | 5/2013 | Ramakrishna | G06F 17/30864 |
| | | | 707/705 |
| 8,463,872 B2 | 6/2013 | Pounds et al. | |
| 8,468,168 B2 | 6/2013 | Brezina et al. | |

(56) References Cited

U.S. PATENT DOCUMENTS

| | | | |
|---|---|---|---|
| 8,495,045 B2 * | 7/2013 | Wolf | G06Q 10/107 707/705 |
| 8,510,389 B1 * | 8/2013 | Gurajada | G06Q 10/107 709/205 |
| 8,522,257 B2 | 8/2013 | Rupp et al. | |
| 8,549,412 B2 | 10/2013 | Brezina et al. | |
| 8,566,306 B2 | 10/2013 | Jones | |
| 8,600,343 B2 | 12/2013 | Brezina et al. | |
| 8,606,335 B2 | 12/2013 | Ozaki | |
| 8,620,935 B2 * | 12/2013 | Rubin | G06F 17/30867 707/754 |
| 8,661,002 B2 | 2/2014 | Smith et al. | |
| 8,666,035 B2 | 3/2014 | Timmins et al. | |
| 8,694,633 B2 | 4/2014 | Mansfield et al. | |
| 8,706,652 B2 | 4/2014 | Yang et al. | |
| 8,745,060 B2 | 6/2014 | Brezina et al. | |
| 8,754,848 B2 | 6/2014 | Holzer et al. | |
| 8,793,625 B2 | 7/2014 | Rhee et al. | |
| 8,818,995 B1 | 8/2014 | Guha | |
| 8,849,816 B2 | 9/2014 | Burba et al. | |
| 8,924,956 B2 | 12/2014 | Smith | |
| 8,972,257 B2 | 3/2015 | Bonforte | |
| 8,982,053 B2 | 3/2015 | Holzer et al. | |
| 8,984,074 B2 | 3/2015 | Monaco | |
| 8,990,323 B2 | 3/2015 | Hein et al. | |
| 9,009,065 B2 | 4/2015 | Reis et al. | |
| 9,020,938 B2 | 4/2015 | Cort et al. | |
| 9,058,366 B2 | 6/2015 | Brezina et al. | |
| 9,087,323 B2 | 7/2015 | Hein et al. | |
| 9,159,057 B2 | 10/2015 | Monaco | |
| 9,195,753 B1 | 11/2015 | King et al. | |
| 9,195,969 B2 | 11/2015 | Bau et al. | |
| 9,235,848 B1 | 1/2016 | Gourley et al. | |
| 9,275,118 B2 | 3/2016 | Brezina et al. | |
| 9,275,126 B2 | 3/2016 | Smith et al. | |
| 9,501,561 B2 | 11/2016 | Rubin et al. | |
| 9,514,466 B2 | 12/2016 | Jacobson et al. | |
| 9,569,529 B2 | 2/2017 | Rubin et al. | |
| 9,584,343 B2 | 2/2017 | Brezina et al. | |
| 9,591,086 B2 | 3/2017 | Brezina et al. | |
| 9,594,832 B2 | 3/2017 | Rubin et al. | |
| 9,596,308 B2 | 3/2017 | Brezina et al. | |
| 9,685,158 B2 | 6/2017 | Bonforte | |
| 9,699,258 B2 | 7/2017 | Brezina et al. | |
| 2001/0022792 A1 | 9/2001 | Maeno et al. | |
| 2001/0037407 A1 * | 11/2001 | Dragulev | G06F 17/30867 709/250 |
| 2001/0049628 A1 | 12/2001 | Icho | |
| 2002/0007310 A1 | 1/2002 | Long | |
| 2002/0016818 A1 | 2/2002 | Kirani et al. | |
| 2002/0024536 A1 | 2/2002 | Kahan et al. | |
| 2002/0049751 A1 | 4/2002 | Chen et al. | |
| 2002/0054587 A1 | 5/2002 | Baker et al. | |
| 2002/0059402 A1 | 5/2002 | Belanger | |
| 2002/0059418 A1 | 5/2002 | Bird et al. | |
| 2002/0059425 A1 | 5/2002 | Belfiore et al. | |
| 2002/0073011 A1 | 6/2002 | Brattain et al. | |
| 2002/0073058 A1 | 6/2002 | Kremer et al. | |
| 2002/0076004 A1 | 6/2002 | Brockenbrough et al. | |
| 2002/0078090 A1 | 6/2002 | Hwang et al. | |
| 2002/0087647 A1 | 7/2002 | Quine et al. | |
| 2002/0091777 A1 | 7/2002 | Schwartz | |
| 2002/0103873 A1 * | 8/2002 | Ramanathan | G06Q 10/107 709/206 |
| 2002/0103879 A1 | 8/2002 | Mondragon | |
| 2002/0107991 A1 | 8/2002 | Maguire et al. | |
| 2002/0116396 A1 | 8/2002 | Somers et al. | |
| 2002/0143871 A1 | 10/2002 | Meyer et al. | |
| 2002/0152216 A1 | 10/2002 | Bouthors | |
| 2002/0163539 A1 | 11/2002 | Srinivasan | |
| 2002/0194502 A1 | 12/2002 | Sheth et al. | |
| 2003/0028525 A1 | 2/2003 | Santos et al. | |
| 2003/0037116 A1 | 2/2003 | Nolan et al. | |
| 2003/0041030 A1 | 2/2003 | Mansfield | |
| 2003/0093483 A1 | 5/2003 | Allen et al. | |
| 2003/0114171 A1 | 6/2003 | Miyamoto | |
| 2003/0114956 A1 | 6/2003 | Cullen et al. | |
| 2003/0120608 A1 | 6/2003 | Pereyra | |
| 2003/0131062 A1 | 7/2003 | Miyashita | |
| 2003/0142125 A1 | 7/2003 | Salmimaa et al. | |
| 2003/0167324 A1 | 9/2003 | Farnham et al. | |
| 2003/0204439 A1 | 10/2003 | Cullen, III | |
| 2003/0217106 A1 | 11/2003 | Adar et al. | |
| 2003/0220835 A1 | 11/2003 | Barnes, Jr. | |
| 2003/0220978 A1 | 11/2003 | Rhodes | |
| 2003/0220989 A1 | 11/2003 | Tsuji et al. | |
| 2003/0233419 A1 | 12/2003 | Beringer | |
| 2004/0002903 A1 | 1/2004 | Stolfo et al. | |
| 2004/0015547 A1 | 1/2004 | Griffin et al. | |
| 2004/0015554 A1 | 1/2004 | Wilson | |
| 2004/0034537 A1 | 2/2004 | Gengarella et al. | |
| 2004/0039630 A1 | 2/2004 | Begole et al. | |
| 2004/0056901 A1 | 3/2004 | March et al. | |
| 2004/0068545 A1 | 4/2004 | Daniell et al. | |
| 2004/0073616 A1 | 4/2004 | Fellenstein et al. | |
| 2004/0078443 A1 | 4/2004 | Malik | |
| 2004/0078444 A1 | 4/2004 | Malik | |
| 2004/0078445 A1 | 4/2004 | Malik | |
| 2004/0100497 A1 | 5/2004 | Quillen et al. | |
| 2004/0122904 A1 | 6/2004 | Kim | |
| 2004/0128355 A1 | 7/2004 | Chao et al. | |
| 2004/0128356 A1 | 7/2004 | Bernstein et al. | |
| 2004/0133561 A1 | 7/2004 | Burke | |
| 2004/0133809 A1 | 7/2004 | Dahl et al. | |
| 2004/0153504 A1 | 8/2004 | Hutchinson et al. | |
| 2004/0162878 A1 | 8/2004 | Lewis et al. | |
| 2004/0174964 A1 | 9/2004 | Koch | |
| 2004/0177048 A1 | 9/2004 | Klug | |
| 2004/0186851 A1 | 9/2004 | Jhingan et al. | |
| 2004/0202117 A1 | 10/2004 | Wilson et al. | |
| 2004/0205002 A1 | 10/2004 | Layton | |
| 2004/0210827 A1 | 10/2004 | Burg et al. | |
| 2004/0215726 A1 | 10/2004 | Arning et al. | |
| 2004/0215734 A1 | 10/2004 | Nagai et al. | |
| 2004/0236749 A1 | 11/2004 | Cortright et al. | |
| 2004/0260756 A1 | 12/2004 | Forstall et al. | |
| 2004/0268229 A1 | 12/2004 | Paoli et al. | |
| 2005/0015432 A1 | 1/2005 | Cohen | |
| 2005/0027699 A1 | 2/2005 | Awadallah et al. | |
| 2005/0027779 A1 | 2/2005 | Schinner | |
| 2005/0038687 A1 | 2/2005 | Galdes | |
| 2005/0044152 A1 | 2/2005 | Hardy et al. | |
| 2005/0049896 A1 | 3/2005 | Giunta | |
| 2005/0055409 A1 | 3/2005 | Alsarraf et al. | |
| 2005/0055639 A1 | 3/2005 | Fogg | |
| 2005/0060638 A1 | 3/2005 | Mathew et al. | |
| 2005/0076090 A1 | 4/2005 | Thuerk | |
| 2005/0076221 A1 | 4/2005 | Olkin et al. | |
| 2005/0080868 A1 | 4/2005 | Malik | |
| 2005/0090911 A1 | 4/2005 | Ingargiola et al. | |
| 2005/0091272 A1 | 4/2005 | Smith et al. | |
| 2005/0091314 A1 | 4/2005 | Blagsvedt et al. | |
| 2005/0091401 A1 | 4/2005 | Keohane et al. | |
| 2005/0102257 A1 | 5/2005 | Onyon et al. | |
| 2005/0102361 A1 | 5/2005 | Winjum et al. | |
| 2005/0131888 A1 | 6/2005 | Tafoya et al. | |
| 2005/0138070 A1 | 6/2005 | Huberman et al. | |
| 2005/0138631 A1 | 6/2005 | Bellotti et al. | |
| 2005/0140653 A1 | 6/2005 | Pletikosa et al. | |
| 2005/0149620 A1 | 7/2005 | Kirkland et al. | |
| 2005/0159970 A1 | 7/2005 | Buyukkokten et al. | |
| 2005/0164704 A1 | 7/2005 | Winsor | |
| 2005/0165584 A1 | 7/2005 | Boody et al. | |
| 2005/0165893 A1 | 7/2005 | Feinberg et al. | |
| 2005/0172234 A1 | 8/2005 | Chuchla | |
| 2005/0188028 A1 | 8/2005 | Brown et al. | |
| 2005/0198159 A1 | 9/2005 | Kirsch | |
| 2005/0198299 A1 | 9/2005 | Beck et al. | |
| 2005/0198305 A1 | 9/2005 | Pezaris et al. | |
| 2005/0203929 A1 | 9/2005 | Hazarika et al. | |
| 2005/0204009 A1 | 9/2005 | Hazarika et al. | |
| 2005/0210111 A1 | 9/2005 | Fukudome | |
| 2005/0213511 A1 | 9/2005 | Reece, Jr. et al. | |

(56) References Cited

U.S. PATENT DOCUMENTS

| | | |
|---|---|---|
| 2005/0216300 A1 | 9/2005 | Appelman et al. |
| 2005/0222890 A1 | 10/2005 | Cheng et al. |
| 2005/0223315 A1 | 10/2005 | Shimizu et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2005/0278321 A1 | 12/2005 | Vailaya et al. |
| 2006/0004713 A1 | 1/2006 | Korte et al. |
| 2006/0004892 A1 | 1/2006 | Lunt |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0041508 A1 | 2/2006 | Pham et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0085752 A1 | 4/2006 | Beadle et al. |
| 2006/0095331 A1 | 5/2006 | O'Malley et al. |
| 2006/0095502 A1 | 5/2006 | Lewis et al. |
| 2006/0101285 A1 | 5/2006 | Chen et al. |
| 2006/0101334 A1 | 5/2006 | Liao et al. |
| 2006/0101350 A1 | 5/2006 | Scott |
| 2006/0106793 A1 | 5/2006 | Liang |
| 2006/0123357 A1 | 6/2006 | Okamura |
| 2006/0129844 A1 | 6/2006 | Oshikiri |
| 2006/0136494 A1 | 6/2006 | Oh |
| 2006/0168059 A1 | 7/2006 | Chang et al. |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0218111 A1 | 9/2006 | Cohen |
| 2006/0224675 A1 | 10/2006 | Fox et al. |
| 2006/0224938 A1 | 10/2006 | Fikes et al. |
| 2006/0242536 A1 | 10/2006 | Yokokawa et al. |
| 2006/0242609 A1* | 10/2006 | Potter ................ H04L 41/22 715/864 |
| 2006/0248151 A1 | 11/2006 | Belakovskiy et al. |
| 2006/0256008 A1 | 11/2006 | Rosenberg |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050455 A1 | 3/2007 | Yach et al. |
| 2007/0050711 A1 | 3/2007 | Walker et al. |
| 2007/0060328 A1 | 3/2007 | Zrike et al. |
| 2007/0071187 A1 | 3/2007 | Apreutesei et al. |
| 2007/0073652 A1 | 3/2007 | Taboada et al. |
| 2007/0078884 A1 | 4/2007 | Ott, IV et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1* | 5/2007 | Xu ................ G06F 17/30616 |
| 2007/0115991 A1 | 5/2007 | Ramani et al. |
| 2007/0118528 A1 | 5/2007 | Choi et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0153989 A1 | 7/2007 | Howell et al. |
| 2007/0156732 A1 | 7/2007 | Surendran et al. |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0192699 A1 | 8/2007 | Lee et al. |
| 2007/0198500 A1 | 8/2007 | Lucovsky et al. |
| 2007/0203991 A1* | 8/2007 | Fisher ................ G06Q 10/107 709/206 |
| 2007/0208802 A1 | 9/2007 | Barman et al. |
| 2007/0214141 A1* | 9/2007 | Sittig .................... G06Q 10/00 |
| 2007/0218900 A1 | 9/2007 | Abhyanker |
| 2007/0244881 A1 | 10/2007 | Cha et al. |
| 2007/0250585 A1 | 10/2007 | Ly et al. |
| 2007/0255794 A1 | 11/2007 | Coutts |
| 2007/0266001 A1 | 11/2007 | Williams et al. |
| 2007/0271527 A1 | 11/2007 | Paas et al. |
| 2007/0273517 A1* | 11/2007 | Govind ................ G06F 19/322 340/572.1 |
| 2007/0282956 A1 | 12/2007 | Staats |
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0010460 A1 | 1/2008 | Schuschan |
| 2008/0031241 A1 | 2/2008 | Toebes et al. |
| 2008/0037721 A1 | 2/2008 | Yao et al. |
| 2008/0040370 A1* | 2/2008 | Bosworth ............ G06F 17/3089 |
| 2008/0040435 A1 | 2/2008 | Buschi et al. |
| 2008/0040474 A1 | 2/2008 | Zuckerberg |
| 2008/0040475 A1 | 2/2008 | Bosworth |
| 2008/0055263 A1 | 3/2008 | Lemay et al. |
| 2008/0056269 A1 | 3/2008 | Madhani et al. |
| 2008/0059428 A1 | 3/2008 | Kinder |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1 | 6/2008 | Jeon et al. |
| 2008/0147639 A1 | 6/2008 | Hartman et al. |
| 2008/0147810 A1 | 6/2008 | Kumar et al. |
| 2008/0154751 A1 | 6/2008 | Miles |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0201304 A1 | 8/2008 | Sue |
| 2008/0208812 A1 | 8/2008 | Quoc et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1* | 9/2008 | Mudd ................ G06F 17/30749 715/765 |
| 2008/0235353 A1 | 9/2008 | Cheever et al. |
| 2008/0235681 A1 | 9/2008 | Barnett |
| 2008/0242277 A1 | 10/2008 | Chen et al. |
| 2008/0243841 A1 | 10/2008 | Bonnet et al. |
| 2008/0244070 A1 | 10/2008 | Kita et al. |
| 2008/0261569 A1 | 10/2008 | Britt et al. |
| 2008/0270038 A1 | 10/2008 | Partovi et al. |
| 2008/0270939 A1 | 10/2008 | Mueller |

(56) References Cited

U.S. PATENT DOCUMENTS

| | | |
|---|---|---|
| 2008/0275748 A1 | 11/2008 | John |
| 2008/0275865 A1 | 11/2008 | Kretz et al. |
| 2008/0290987 A1* | 11/2008 | Li .................... G06Q 30/02 340/5.1 |
| 2008/0293403 A1 | 11/2008 | Quon et al. |
| 2008/0301166 A1 | 12/2008 | Sugiyama et al. |
| 2008/0301175 A1* | 12/2008 | Applebaum ........ G06F 17/3051 |
| 2008/0301245 A1 | 12/2008 | Estrada et al. |
| 2008/0307046 A1 | 12/2008 | Baek et al. |
| 2008/0307066 A1 | 12/2008 | Amidon et al. |
| 2008/0313650 A1 | 12/2008 | Arnquist et al. |
| 2008/0319943 A1 | 12/2008 | Fischer |
| 2008/0320417 A1 | 12/2008 | Begley et al. |
| 2009/0005076 A1 | 1/2009 | Forstall et al. |
| 2009/0010353 A1 | 1/2009 | She et al. |
| 2009/0012806 A1 | 1/2009 | Ricordi et al. |
| 2009/0029674 A1 | 1/2009 | Brezina et al. |
| 2009/0030872 A1* | 1/2009 | Brezina .................. H04M 15/00 |
| 2009/0030919 A1 | 1/2009 | Brezina et al. |
| 2009/0030927 A1 | 1/2009 | Cases et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0041224 A1 | 2/2009 | Bychkov et al. |
| 2009/0048994 A1 | 2/2009 | Applebaum et al. |
| 2009/0054091 A1 | 2/2009 | van Wijk |
| 2009/0070412 A1 | 3/2009 | D'Angelo |
| 2009/0077026 A1 | 3/2009 | Yanagihara |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0112678 A1 | 4/2009 | Luzardo |
| 2009/0119678 A1 | 5/2009 | Shih et al. |
| 2009/0125321 A1 | 5/2009 | Charlebois et al. |
| 2009/0125462 A1 | 5/2009 | Krishnaswamy et al. |
| 2009/0125517 A1 | 5/2009 | Krishnaswamy et al. |
| 2009/0125585 A1 | 5/2009 | Krishnaswamy et al. |
| 2009/0132949 A1 | 5/2009 | Bosarge |
| 2009/0150251 A1* | 6/2009 | Zhitomirsky ...... G06Q 30/0601 705/26.1 |
| 2009/0156170 A1 | 6/2009 | Rossano et al. |
| 2009/0157717 A1 | 6/2009 | Palahnuk et al. |
| 2009/0164902 A1 | 6/2009 | Cohen et al. |
| 2009/0171930 A1 | 7/2009 | Vaughan et al. |
| 2009/0174680 A1 | 7/2009 | Anzures et al. |
| 2009/0177754 A1* | 7/2009 | Brezina ................ G06Q 10/107 709/206 |
| 2009/0182552 A1 | 7/2009 | Fyke et al. |
| 2009/0182788 A1* | 7/2009 | Chung ................ G06Q 10/107 |
| 2009/0187991 A1 | 7/2009 | Freericks et al. |
| 2009/0191899 A1 | 7/2009 | Wilson et al. |
| 2009/0198688 A1 | 8/2009 | Venkataraman et al. |
| 2009/0204903 A1 | 8/2009 | Edelen et al. |
| 2009/0209286 A1 | 8/2009 | Bentley et al. |
| 2009/0213088 A1 | 8/2009 | Hardy et al. |
| 2009/0216847 A1 | 8/2009 | Krishnaswamy et al. |
| 2009/0217178 A1 | 8/2009 | Niyogi et al. |
| 2009/0228555 A1 | 9/2009 | Joviak et al. |
| 2009/0234815 A1* | 9/2009 | Boerries ........... G06F 17/30867 |
| 2009/0234925 A1 | 9/2009 | Seippel, III et al. |
| 2009/0240669 A1 | 9/2009 | Ando et al. |
| 2009/0248415 A1 | 10/2009 | Jablokov et al. |
| 2009/0249198 A1 | 10/2009 | Davis et al. |
| 2009/0271370 A1* | 10/2009 | Jagadish ................ G06Q 10/10 |
| 2009/0271409 A1 | 10/2009 | Ghosh |
| 2009/0276713 A1 | 11/2009 | Eddy |
| 2009/0299824 A1 | 12/2009 | Barnes, Jr. |
| 2009/0300127 A1 | 12/2009 | Du |
| 2009/0300546 A1 | 12/2009 | Kwok et al. |
| 2009/0300596 A1 | 12/2009 | Tyhurst et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0327849 A1 | 12/2009 | Kavanagh et al. |
| 2009/0328161 A1 | 12/2009 | Puthenkulam et al. |
| 2010/0009332 A1 | 1/2010 | Yaskin et al. |
| 2010/0030715 A1 | 2/2010 | Eustice et al. |
| 2010/0036833 A1 | 2/2010 | Yeung et al. |
| 2010/0049534 A1 | 2/2010 | Whitnah |
| 2010/0057858 A1 | 3/2010 | Shen et al. |
| 2010/0060595 A1 | 3/2010 | Lee et al. |
| 2010/0062753 A1 | 3/2010 | Wen et al. |
| 2010/0073284 A1 | 3/2010 | Dods et al. |
| 2010/0077041 A1* | 3/2010 | Cowan .................... G06F 15/16 709/206 |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0094911 A1 | 4/2010 | Bird |
| 2010/0100899 A1 | 4/2010 | Bradbury et al. |
| 2010/0121831 A1 | 5/2010 | Lin et al. |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1* | 6/2010 | Leblanc ............. H04L 67/2823 709/204 |
| 2010/0162171 A1 | 6/2010 | Felt et al. |
| 2010/0164957 A1 | 7/2010 | Lindsay |
| 2010/0167700 A1 | 7/2010 | Brock et al. |
| 2010/0169327 A1 | 7/2010 | Lindsay |
| 2010/0174784 A1 | 7/2010 | Levey et al. |
| 2010/0185610 A1 | 7/2010 | Lunt |
| 2010/0191844 A1 | 7/2010 | He et al. |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229157 A1 | 9/2010 | Ergan et al. |
| 2010/0229223 A1 | 9/2010 | Shepard |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0273456 A1 | 10/2010 | Wolovitz et al. |
| 2010/0281535 A1 | 11/2010 | Perry, Jr. et al. |
| 2010/0306185 A1 | 12/2010 | Smith |
| 2010/0312837 A1 | 12/2010 | Bodapati et al. |
| 2010/0318614 A1 | 12/2010 | Sager et al. |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1* | 2/2011 | Crosbie ............. G06F 17/30398 707/610 |
| 2011/0072052 A1 | 3/2011 | Skarin et al. |
| 2011/0078259 A1 | 3/2011 | Rashad et al. |
| 2011/0086627 A1 | 4/2011 | Khosravi |
| 2011/0087969 A1 | 4/2011 | Hein et al. |
| 2011/0119593 A1 | 5/2011 | Jacobson et al. |
| 2011/0145192 A1* | 6/2011 | Quintela ............. G06Q 10/107 707/623 |
| 2011/0145219 A1* | 6/2011 | Cierniak ........... G06F 17/30867 707/709 |
| 2011/0173274 A1 | 7/2011 | Sood |
| 2011/0173547 A1 | 7/2011 | Lewis et al. |
| 2011/0191337 A1 | 8/2011 | Cort |
| 2011/0191340 A1 | 8/2011 | Cort |
| 2011/0191717 A1 | 8/2011 | Cort et al. |
| 2011/0191768 A1 | 8/2011 | Smith |
| 2011/0196802 A1 | 8/2011 | Ellis et al. |
| 2011/0201275 A1 | 8/2011 | Jabara et al. |
| 2011/0219317 A1 | 9/2011 | Thatcher et al. |
| 2011/0225293 A1 | 9/2011 | Rathod |
| 2011/0231407 A1 | 9/2011 | Gupta et al. |
| 2011/0235790 A1 | 9/2011 | Strope et al. |
| 2011/0252383 A1 | 10/2011 | Miyashita |
| 2011/0276396 A1 | 11/2011 | Rathod |
| 2011/0282905 A1 | 11/2011 | Polis et al. |
| 2011/0291860 A1 | 12/2011 | Ozaki et al. |
| 2011/0291933 A1 | 12/2011 | Holzer et al. |

(56) References Cited

U.S. PATENT DOCUMENTS

| | | | |
|---|---|---|---|
| 2011/0298701 A1 | 12/2011 | Holzer et al. | |
| 2012/0011204 A1* | 1/2012 | Morin | G06Q 10/10 |
| | | | 709/205 |
| 2012/0017158 A1 | 1/2012 | Maguire et al. | |
| 2012/0023416 A1 | 1/2012 | Khoo | |
| 2012/0036254 A1* | 2/2012 | Onuma | H04L 67/16 |
| | | | 709/224 |
| 2012/0041907 A1 | 2/2012 | Wang et al. | |
| 2012/0054681 A1* | 3/2012 | Cort | G06F 3/048 |
| | | | 715/816 |
| 2012/0060102 A1 | 3/2012 | Shohfi et al. | |
| 2012/0079023 A1 | 3/2012 | Tejada-Gamero et al. | |
| 2012/0084461 A1 | 4/2012 | Athias et al. | |
| 2012/0089678 A1 | 4/2012 | Cort et al. | |
| 2012/0089690 A1 | 4/2012 | Hein et al. | |
| 2012/0110080 A1 | 5/2012 | Panyam et al. | |
| 2012/0110096 A1 | 5/2012 | Smarr et al. | |
| 2012/0150970 A1 | 6/2012 | Peterson et al. | |
| 2012/0150978 A1 | 6/2012 | Monaco et al. | |
| 2012/0150979 A1 | 6/2012 | Monaco | |
| 2012/0166999 A1 | 6/2012 | Thatcher et al. | |
| 2012/0197871 A1 | 8/2012 | Mandel et al. | |
| 2012/0198348 A1 | 8/2012 | Park | |
| 2012/0204089 A1 | 8/2012 | Boudreau et al. | |
| 2012/0246065 A1 | 9/2012 | Yarvis et al. | |
| 2012/0259834 A1 | 10/2012 | Broder et al. | |
| 2012/0271822 A1 | 10/2012 | Schwendimann et al. | |
| 2012/0278428 A1 | 11/2012 | Harrison et al. | |
| 2012/0310977 A1 | 12/2012 | Bush et al. | |
| 2012/0330658 A1 | 12/2012 | Bonforte | |
| 2012/0330980 A1 | 12/2012 | Rubin et al. | |
| 2012/0331418 A1 | 12/2012 | Bonforte | |
| 2013/0007627 A1 | 1/2013 | Monaco | |
| 2013/0014021 A1* | 1/2013 | Bau | G06Q 10/107 |
| | | | 715/739 |
| 2013/0053074 A1 | 2/2013 | Sanchez et al. | |
| 2013/0080915 A1 | 3/2013 | Lewis et al. | |
| 2013/0091288 A1 | 4/2013 | Shalunov et al. | |
| 2013/0120444 A1 | 5/2013 | Allyn et al. | |
| 2013/0173712 A1 | 7/2013 | Monjas Llorente et al. | |
| 2013/0246931 A1 | 9/2013 | Harris et al. | |
| 2013/0260795 A1 | 10/2013 | Papakipos et al. | |
| 2014/0011481 A1 | 1/2014 | Kho | |
| 2014/0081914 A1 | 3/2014 | Smith et al. | |
| 2014/0081964 A1 | 3/2014 | Rubin et al. | |
| 2014/0087687 A1 | 3/2014 | Brezina et al. | |
| 2014/0089304 A1 | 3/2014 | Rubin et al. | |
| 2014/0089411 A1 | 3/2014 | Rubin et al. | |
| 2014/0100861 A1 | 4/2014 | Ledet | |
| 2014/0115086 A1 | 4/2014 | Chebiyyam | |
| 2014/0214981 A1* | 7/2014 | Mallet | G06Q 50/01 |
| | | | 709/206 |
| 2015/0074213 A1 | 3/2015 | Monaco | |
| 2015/0170650 A1 | 6/2015 | Bonforte | |
| 2016/0070787 A1 | 3/2016 | Brezina et al. | |
| 2016/0182661 A1 | 6/2016 | Brezina et al. | |
| 2017/0083190 A1 | 3/2017 | Jacobson et al. | |
| 2017/0147699 A1 | 5/2017 | Rubin et al. | |
| 2017/0171124 A1 | 6/2017 | Brezina et al. | |
| 2017/0187663 A1 | 6/2017 | Brezina et al. | |

FOREIGN PATENT DOCUMENTS

| | | |
|---|---|---|
| JP | 2003006116 | 1/2003 |
| JP | 2007249307 | 9/2007 |
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | 03098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

Elsayed, Tamer et al., "Personal Name Resolution in Email: A Heuristic Approach," University of Maryland Technical Report No. TR-LAMP-150, Mar. 17, 2008.

Microsoft Corporation, "About AutoComplete Name Suggesting," Microsoft Outlook 2003 help forum, located at http://office.microsoft.com/en-us/outlook/HP063766471033.aspx, 2003.

European Patent Application No. 12801970.0, Extended Search Report, dated Oct. 23, 2014.

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).

European Patent Application No. 11849271.9, Extended Search Report, dated Apr. 3, 2014.

Extended European Search Report, EP 10 78 3783, dated Mar. 24, 2014.

Fitzpatrick, Brad, "AddressBooker," Github Social Coding, located at http://addressbooker.appspot.com/, Nov. 28, 2008 (document provided includes third-party comments submitted under the USPTO PeerToPatent program).

Google Inc. "OpenSocial Tutorial," located at http://code.google.com/apis/opensocial/articles/tutorial/tutorial-0.8.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).

International Patent Application PCT/US10/34782, International Search Report and Written Opinion, dated Dec. 22, 2010.

International Patent Application PCT/US10/35405, International Search Report and Written Opinion, dated Jan. 3, 2011.

International Patent Application PCT/US10/52081, International Search Report and Written Opinion, dated May 20, 2011.

International Patent Application PCT/US10/56560, International Search Report and Written Opinion, dated Jun. 21, 2011.

International Patent Application PCT/US11/64958, International Search Report and Written Opinion, dated Jul. 31, 2012.

International Patent Application PCT/US12/043523, International Search Report and Written Opinion, dated Nov. 28, 2012.

International Patent Application PCT/US2011/064892, International Search Report and Written Opinion, dated Aug. 22, 2012.

International Patent Application PCT/US2012/043507, International Search Report and Written Opinion, dated Jan. 3, 2013.

Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.

OpenSocial Foundation, "Social Application Tutorial (v0.9)," located at http://wiki.opensocial.org/index.php?title=Social_Application_Tutorial, accessed Oct. 8, 2010.

(56) References Cited

OTHER PUBLICATIONS

PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
U.S. Appl. No. 61/407,018 filed Oct. 27, 2010.
W3i, LLC, "Advertiser Feedback System (AFS)," company product description. Sep. 22, 2009.
Wikimedia Foundation, Inc., "Machine Learning," Wikipedia encyclopedia entry located at http://en.wikipedia.org/wiki/Machine_learning, Jan. 30, 2011.
European Patent Application 12801998.1, Extended Search Report, dated Feb. 10, 2015.
Epstein, "Harnessing User Data to Improve Facebook Features", Doctoral dissertation, Boston College, May 12, 2010.
Hannon et al., "Recommending Twitter Users to Follow Using Content and Collaborative Filtering Approaches", RecSys2010, Sep. 26-30, 2010, Barcelona, Spain.
European Patent Application No. 10797483.4, extended European Search Report, dated Dec. 20, 2016.
"The Ultimate Guide for Everything Twitter", Webdesigner Depot, archive.org webpage https://web.archive.org/web/20090325042115/http://www.webdesignerdepot.com/2009/03/the-ultimate-guide-for-everything- twitter/ from Mar. 25, 2009.
"OpenSocial Specification v0.9", OpenSocial and Gadgets Specification Group, Apr. 2009.

\* cited by examiner

PROVIDING PROFILE INFORMATION USING SERVERS

RELATED APPLICATIONS

This application is a continuation application of U.S. patent application Ser. No. 12/875,982, filed Sep. 3, 2010, entitled "PROVIDING PROFILE INFORMATION USING SERVERS," which claims priority to U.S. Prov. App. Ser. No. 61/301,172, filed Feb. 3, 2010, entitled "SYSTEMS AND METHODS TO PROVIDE PROFILE INFORMATION USING SERVERS," each of which applications is hereby incorporated by reference in its entirety.

FIELD OF THE TECHNOLOGY

At least some embodiments of the disclosure relate to client applications in general and, more particularly but not limited to, provision of profile information.

BACKGROUND

Many systems and applications have been developed to allow people to communicate with each other. Such systems and applications may provide communication via emails, instant messages, text messages, web/online postings, etc.

Some applications have been developed to organize address information for users. For example, an address application may store information about a plurality of persons. For each of the persons, the address application may store the name of the person, the email address of the person, the street address of the person, the IM address of the person, the web page address of the person, phone numbers of the person, etc.

SUMMARY OF THE DESCRIPTION

Systems and methods are provided to provide profile information. Some embodiments are summarized in this section.

In one embodiment, a computer-implemented method includes: generating, on a server platform, profile data for each of a plurality of users including a first user, the profile data related to contacts or persons used in messages to or from each respective user of the plurality of users; generating, via the server platform, parameters corresponding to the profile data for ranking contacts or persons; and transmitting, from the server platform, the parameters to a plurality of client devices to allow each of the client devices to determine ranks of contacts or persons in the profile data based on the parameters and a function that uses the parameters, the plurality of client devices including a first client device of the first user.

The disclosure includes methods and apparatuses which perform these methods, including data processing systems which perform these methods, and computer readable media containing instructions which when executed on data processing systems cause the systems to perform these methods. Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a user terminal is configured to provide assistance for the completion of inputting an address. While the user is typing to provide an input to specify an address for a message, the user terminal uses the incomplete input that has been provided to an address field so far by the user to identify one or more options or suggestions to complete the input, and thus allows the user to complete the input by selecting one.

In one embodiment, the user terminal is configured to search a profile set to search for a portion of the candidates that matches the incomplete input provided by the user. The profile set contains information about a plurality of persons, to whom the user may or may not have previously sent a message.

Figure 1:
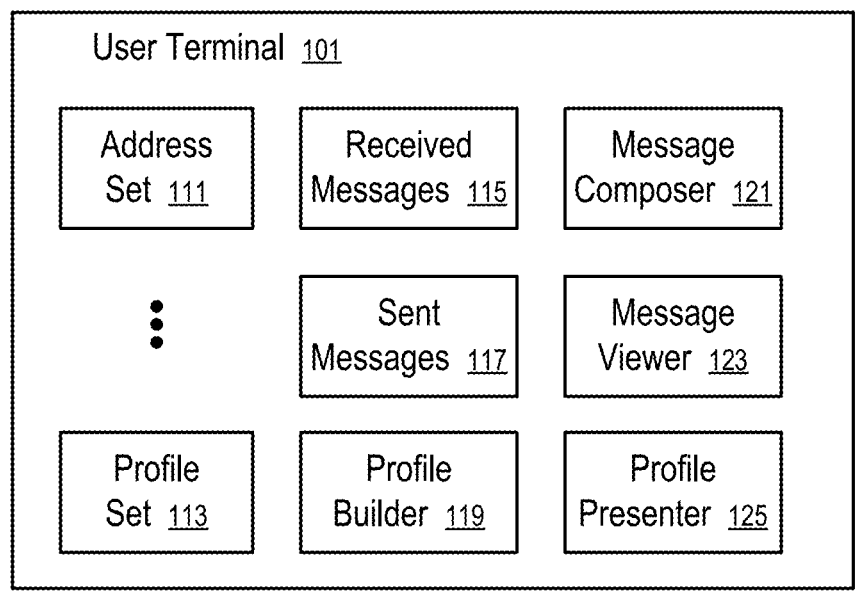
FIG. 1 shows a user terminal to provide assistance in address input according to one embodiment.

FIG. 1 shows a user terminal to provide assistance in address input according to one embodiment. The user terminal may be implemented as a personal computer, a web enabled television set, a personal digital assistant (PDA), or a mobile phone, using special purpose hardware (Application-Specific Integrated Circuit (ASIC) or Field-Programmable Gate Array (FPGA)), software and a general purpose processor, or a combination of special purpose hardware and software. Thus, the disclosure is not limited to a particular implementation.

In FIG. 1, the user terminal (101) is configured to store the messages (115) received at the user terminal (101) and the messages (117) sent from the user terminal (101). The user terminal (101) includes a message viewer (123) which can be used to display a message selected from the received messages (115) or selected from the sent messages (117).

In FIG. 1, the user terminal (101) further includes a message composer (121) which is configured to present a user interface to facilitate the composition of an outgoing message.

In one embodiment, the user terminal (101) is configured to generate an address set (111) based on the addresses that have been specified in the message composer (121) for one or more previously sent messages (117). When an address is used in the message composer (121) to specify a recipient of a message, the address is added to the address set (111), if the address is not already in the address set (111).

In one embodiment, the message composer (121) uses the address set (111) to suggest candidates for the completion of an input when the user is typing an address. For example, when the characters typed in an address field are the same as the first characters in a number of email addresses in the address set (111), the message composer (121) displays the email addresses as possible candidates for the completion of the input.

In one embodiment, the user terminal (101) further includes a profile presenter (125), which can provide suggestions for completion based on the profile set (113) maintained by the profile builder (119).

In one embodiment, the profile builder (119) is configured to extract profile data of various persons based on the received messages (115) and the sent messages (117). The profile builder (119) can extract information about persons not only from the headers of the messages where the senders and the recipients of the messages are specified, but also from the bodies of the messages and from other online sources, such as online directories, social networking websites, web pages, result pages found by search engines, etc.

Since the profile builder (119) obtains the profile data for various persons referenced in the messages (115 and 117), the profile set (113) is more comprehensive than the address set (111).

In one embodiment, the profile builder (119) is configured to scan the received messages (115) and the sent messages (117) for email addresses and names associated with the email addresses. The profile builder (119) generates a profile for each person identified to create the profile set (113). When new messages are received or sent, the profile set (113) is updated based on the new messages.

In some embodiments, the profile builder (119) may further identify persons based on scanning the received messages (115) and the sent messages (117) for phone numbers, names, addresses, etc.

In some embodiments, as discussed in more detail below, some or all of the components (111-125) in the user terminal (101) may be hosted on a server or platform remote to the user terminal (101) (e.g., accessible via a website and a web browser) in addition to or instead of being implemented in the user terminal (101). For example, in one embodiment, in addition to the user terminal (101), the profile set (113) may be hosted on a remote server or platform, and accessible via a web site. As another example, in one embodiment, the received messages (115) and the sent messages (117) may be hosted on a web site; and the user can use a web browser to view a selected one of the messages (115 and 117).

For example, the profile builder (119) may be configured to communicate with the server to extract the profile set (113) from the messages (115 and 117) hosted on the server. Alternatively, the profiler builder (119) may also be hosted on the server to build the profile set (113) on the server.

Figure 2:
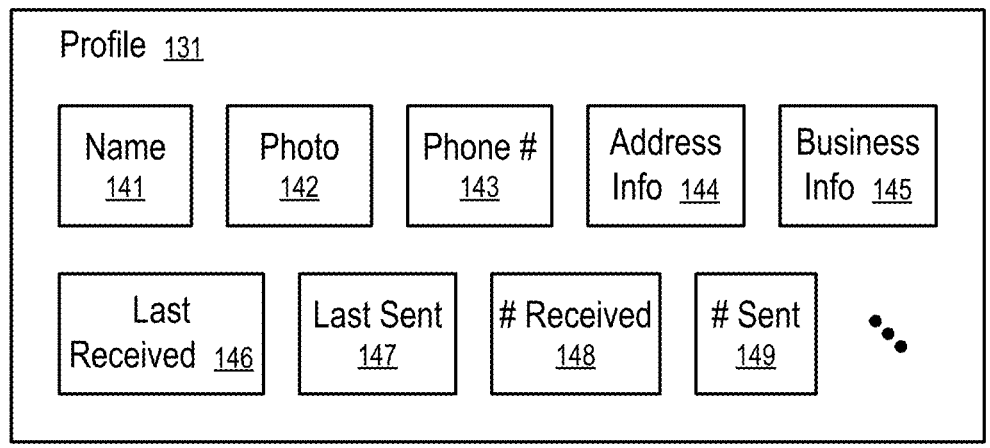
FIG. 2 illustrates a profile of a person according to one embodiment.

FIG. 2 illustrates a profile of a person according to one embodiment. In FIG. 2, the profile (131) includes various fields, such as the name (141) of the person, a photo image (142) of the person, one or more phone numbers of the person (143), address information (144) (e.g., email address, IM address, street address), business information (145) (e.g., employer, work address, job title), the date and time of the last message received from the person (146), the date and time of the last message sent to the person (147), the total number of messages received from the person (148), the total number of messages sent to the person (149), etc.

In one embodiment, the profile builder (119) obtains at least some of the information for the fields from the received messages (115) or the sent messages (117) to identify the person, and then uses other information sources to obtain the data for the other fields in an automated way to collect the profile information on behalf of the user.

For example, the profile builder (119) may use social networks, search engines, photo services, etc. to obtain the photo (142), the business information (145), etc.

Figure 3:
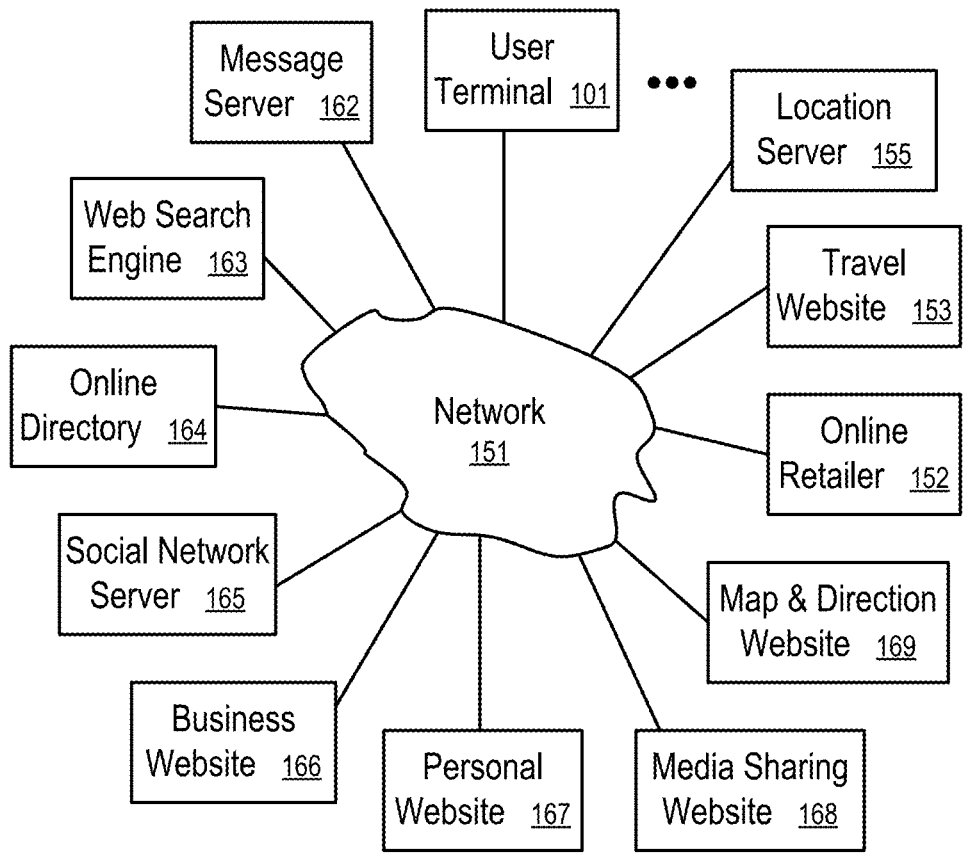
FIG. 3 illustrates a system to obtain data for a profile according to one embodiment.

FIG. 3 illustrates a system to obtain data for a profile according to one embodiment. In FIG. 3, under the control of the profile builder (119), the user terminal (101) may communicate with various servers in an automated way to extract data for the profile (131) over the network (151). The network (151) may include a local area network, a cellular telecommunications network, a wireless wide area network, a wireless local area network, a wireless personal area network, an intranet, and/or Internet.

In one embodiment, the user terminal (101) communicates with the message server (162) to receive and send the messages (115 and 117).

In one embodiment, after the profile builder (119) extracts from the messages (115 or 117) certain information (e.g., an email address, an IM user name, a phone number, and/or a name) about a person, the profile builder (119) uses the extracted information to query various servers to obtain further information (e.g., photo (142), phone number (143), address information (144), and/or business information (145)) about the person to create the profile (131).

For example, the user terminal (101) may query a web search engine (163), an online directory (164), a social network server (165), a business website (166), a personal website (167), a media sharing website (168), a map and direction web site (169), an online retailer (152), a travel website (153), a location website (155), and/or other servers. Information that can be used as search criteria include names, screen names, social network profile names, social network profile URLs, physical addresses, website URLs, email addresses, or telephone numbers. Information that is collected as a result of these queries may be used in future searches to identify additional information that may be used to create a person profile.

For example, the user terminal (101) may receive an email sent by a person via the message server (162). The profile builder (119) of the user terminal (101) is configured to perform a search using the web search engine (163) with the email address of the person as the search criteria. The search engine (163) may return a search result that includes the phone number (143) of the person. The profile builder (119) extracts the phone number (143) from the search result and stores the phone number (143) as part of the profile (131) of the person. The search engine (163) may also return the URL for or link to a personal website (167) belonging to the person. The personal website (167) may contain additional information about the person that may be used to create a person profile, such as additional contact information or biographical information.

In another example, the email address belonging to the person may include an extension (or domain name) for a company. The profile builder (119) of the user terminal (101) is configured to perform a search using the search engine (163) with the email extension (or domain name) as the search criteria. A result returned by the search may be a business website (166). The profile builder (119) of the user terminal (101) is further configured to search the business website (166) to obtain information relevant to the profile (131) of the person. For example, a web page on the business website (166) may contain additional information about the person that may be used to create a person profile, such as business information (145), additional contact information or biographical information.

In another example, the profile builder (119) of the user terminal (101) is configured to perform a search using an online directory (164) (e.g., a person search directory, a yellow page directory) with the name (141) of the person or other contact information as the search criteria. The online directory (164) may return search results that include additional contact information and other information that may be used for the profile (131) of the person.

In another example, the user terminal (101) may receive an email sent by the person via the message server (162). The email may contain a social network user name for the person. The profile builder (119) of the user terminal (101) is configured to extract this social network user name from the email and use it to access the social network server (165). A webpage on the social network server (165) may contain additional contact information and other information that may be extracted and used by the profile builder (119) to create the profile (131) of the person. The webpage on the social network server (165) may also contain additional contacts that may be associated with the person in the profile (131). For example, persons on the friends list of the webpage on the social network server (165), or persons who have posted comments or messages on the social network server (165) may be listed as contacts in a contact network for the person.

In another example, a search performed using the search engine (163) may return a URL or link for a media sharing website (168) (e.g., for sharing photos or videos). The media sharing website (168) may store profile information about the person. Thus, the profile builder (119) of the user terminal (101) can extract additional contact information or biographical information from the media sharing website (168) for the creation of the profile (131) of the person. For example, a profile belonging to the person on a video sharing website may include an instant message screen name (user name) for the person. This screen name may be extracted and displayed as part of the profile (131) of the person.

In one embodiment, information extracted from communications between the person and other users may also be used to update profile information on a social network server (165) or other websites. For example, the profile builder (119) of the user terminal (101) may detect that the person has primarily used email address "david@foo.com" in recent communications, whereas the profile of the person on the social network server (165) shows his email address as "david@bar.com." The profile builder (119) of the user terminal (101) can share the new email address of the person with the social network server (165) to allow the social network server (165) to automatically update the corresponding information about the person, or to suggest the person to make an update based on this changed behavior detected by the profile builder (119) of the user terminal (101).

In one embodiment, the profile builder (119) of the user terminal (101) can also extract information about the person from the travel website (153) and the online retailer (152) for the creation of the profile (131) of the person. For example, after an email containing information about a flight itinerary is received in the user terminal (101), the profile builder (119) of the user terminal (101) may extract a flight number or other information about a flight from the email. The profile builder (119) of user terminal (101) then queries the travel website (153) using the flight number or other flight information as search criteria. Information about the flight, such as the destination city or the departure city, expected departure time, expected arrival time, expected delays, weather in the destination city, weather in the departure city, or any changes to the flight may be used as part of the profile (131) of the person.

In another example, an email containing information about an item or service that the second user is interested in purchasing may be received in the user terminal (101). The profile builder (119) of user terminal (101) is configured to query one or more search engines, websites, or on-line retailers (152) to determine which retailer or website has the best price or currently has the item in stock or the service available. This information is extracted by the profile builder (119) and displayed by the profile presenter (125) as part of the profile (131) of the person.

In one embodiment, the profile builder (119) of the user terminal (101) can also extract information from a map and direction website (169) and location servers (155) as part of the profile (131) of the person. For example, the person may own a GPS unit, cell phone, or other device that is capable of transmitting the person's current physical location to the location server (155), which allows other users to access the person's current location information. If the user of the user terminal (101) has permission to view the location information of the person, the profile builder (119) of the user terminal (101) may access the location server (155) over the network (151) to receive location information about the person. This location information can be displayed as part of a person profile.

The profile builder (119) of the user terminal (101) may also access the map and direction website (169) to create a map of the current location of the person, or to generate directions to the current location of the person. The map or directions may be displayed by the profile presenter (125) as part of the profile (131) of the person. The map and direction website (169) may also be used to generate a map or directions to one or more known street addresses of the person, such as a work address or home address. The map or directions can be displayed by the profile presenter (125) as part of the profile (131) of the person.

Figure 4:
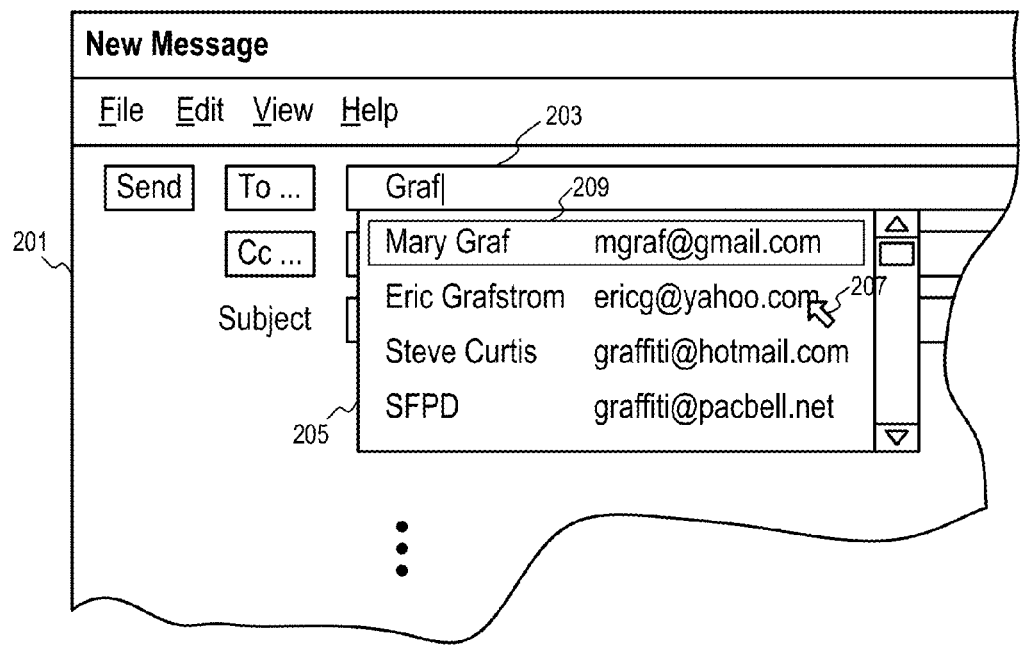
FIG. 4 illustrates a user interface to provide assistance in address input according to one embodiment.

FIG. 4 illustrates a user interface to provide assistance in address input according to one embodiment. In FIG. 4, the user interface (201) is configured for composing an outgoing message. The user interface (201) includes entries to specify the addresses of the recipients of the message. For example, the entry box (203) is configured to receive the email address of an outgoing email, which may be sent from the user terminal (101) via the message server (162).

In one embodiment, when the entry box (203) detects a change in the content received in the entry box (203) (e.g., a keystroke is received in the entry box (203), as the user types a letter on a keyboard to provide an input), the profile presenter (125) determines a set of suggestions for the completion of the input in the entry box (203). The profile presenter (125) uses the incomplete input in the entry box (203) as a search criterion to find from the profile set (113) a set of suggestions for the complete address input. The suggestions are presented in the window (205) as a selectable list.

In one embodiment, when the message composer (121) has an existing, native mechanism for displaying suggestions (e.g., making suggestions based on address set (111)), the profile presenter (125) can be configured as an add-on module to display these suggestions as well and to hide the native mechanism of the message composer (121) for displaying suggestions.

In FIG. 4, the item (209) on the top of the list is highlighted; and the user may select the highlighted item (209) with a keystroke (e.g., pressing Tab key, Enter key, Home, End, PgUp, PgDown, etc.). The user may use the arrow keys to move the highlight up or down the list to highlight a different item, or provide additional input in the entry box (203) to cause the profile presenter (125) to update the suggestions in the window (205). The user may also use the cursor (207) to select an item using a cursor control, such as a mouse, a track ball, a touch pad, a touch screen, etc.

In one embodiment, when the message composer (121) has an existing, native mechanism that uses these keys for the display of suggestions, the profile presenter (125) configured as an add-on module can hide these keystrokes from the native mechanism.

In one embodiment, after an item is selected from the list presented in the suggestion window (205), the address represented by the item is inserted by the profile presenter (125) into the entry box (203) to replace the corresponding portion that is used to suggest the selected item; and the suggestion window (205) is closed automatically.

In some embodiments, the message composer (121) may be configured to perform post-processing, such as name checking, on the inserted text in the entry box (203) a few moments after the text has been inserted. The insertion by the profile presenter (125) is performed in a way that allows such post-processing by the message composer (121) to continue functioning. For example, if the message composer (121) loses focus or activation, it starts post-processing the entries in the textbox. The profile presenter (125) is configured to temporarily prevent this from happening while the suggestion window (205) is visible and causes this to happen when the suggestion window (205) is closed. To hide the suggestion window (205), the suggestion window (205) is configured as a topmost window that is initially not activated. The Outlook textbox window is subclassed via a code-injection mechanism to temporarily preventing it from getting "kill focus" messages (e.g., through intercepting such messages, and then throwing them away). After the suggestion window (205) becomes invisible, the profile presenter (125) sets the focus back to the textbox window and causes the post-processing to be performed.

For example, in FIG. 4, the incomplete input "Graf" is received in the entry box (203). The cursor "|" in the entry box (203) indicates the insertion point for subsequent keystrokes received in the user terminal (101). While the entry box (203) is expecting additional input from the user, the profile presenter (125) uses the incomplete input "Graf" to identify a set of suggestions, such as mgraf@gmail.com for Mary Graf, ericg@yahoo.com for Eric Grafstrom, graffiti@hotmail.com for Steve Curtis, graffiti@pacbell.net for SFPD, etc., based on the profile set (113) established by the profile builder (119).

In one embodiment, the suggestions are identified by matching the incomplete input with names, addresses and/or other profile data of the persons in the profile set (113). The incomplete input may match the beginning of a last name, the beginning of a first name, the beginning of the name of an organization, the beginning of a domain name of an email address, the beginning of the top level domain name of an email address, the beginning of the email prefix, the beginning of a word in the job title (or the beginning of the job title), the beginning of the city of the person, etc. In some embodiments, when an email prefix contains one or more separators, such as "_" or "." or "-", the email prefix is broken down into segments or chunks; and the incomplete input may be match the beginning of any of the segments or chunks. When there is a match, the person can be selected as a candidate for the suggestions. Thus, the searching for a match is not limited to matching the beginning of an address that the user has previously typed for a previous outgoing message.

In FIG. 4, the top item, mgraf@gmail.com for Mary Graf, is highlighted and can be selected by pressing the Tab key or the Enter key. Alternatively, the user may select the second item, ericg@yahoo.com for Eric Grafstrom, by pressing a mouse button while the cursor (207) is over the second item. The profile presenter (125) is configured to use the selected address to replace the incomplete input "Graf" received in the entry box (203).

In FIG. 4, if the user further types a letter "f", the profile presenter (125) will use the incomplete input "Graff" to eliminate some suggestions (e.g., mgraf@gmail.com for Mary Graf, ericg@yahoo.com for Eric Grafstrom) and update the list in the suggestion window (205).

Thus, the profile presenter (125) uses the profile set (113) to identify suggestions based on incomplete input provided in the entry box (203) and to allow the user to select a suggestion to complete the input.

FIG. 4 illustrates an example in which the suggestion window (205) is presented to provide suggestions for the completion of an address input in the "To" field of the user interface (201) for composing an outgoing message. Similar suggestions can be provided when the user is typing in other fields that are configured to receive address inputs, such as the "CC" field, or "BCC" field, of a user interface for composing an outgoing email message. Further, the suggestions can be provided when the user is typing in other types of user interfaces that are configured to receive address inputs, such as a user interface to edit a contact entry, a profile page, etc. Thus, the invention is not limited to the user interface for composing an email message.

Figure 5:
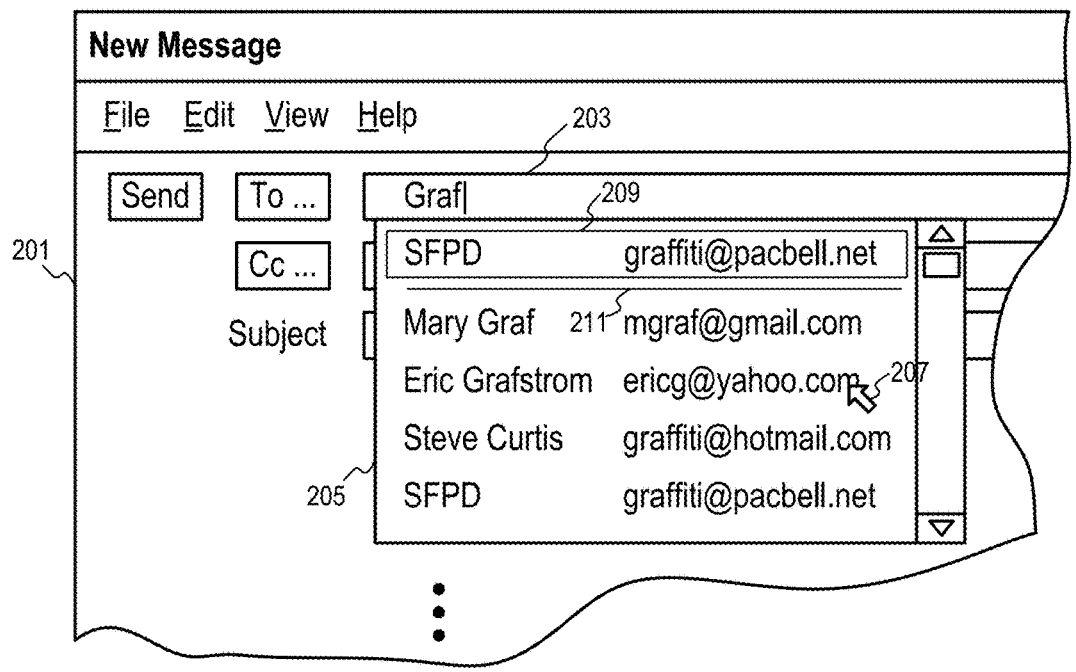
FIG. 5 illustrates another user interface to provide assistance in address input according to one embodiment.

FIG. 5 illustrates another user interface to provide assistance in address input according to one embodiment.

In FIG. 5, the suggestions are presented as two parts. The part above the separator (211) is identified from the address set (111) and the part below the separator (211) is identified from the profile set (113).

In one embodiment, the address set (111) is generated by collecting the addresses that have been previously specified in the address fields of the message composer (121) of the user terminal (101). In one embodiment, the suggestion above the separator (211) is identified by matching the incomplete input "Graf" with the starting letters of the addresses in the address set (111). The addresses in the address set (111) that have the leading characters "graf" are selected to generate the suggestions above the separator (211).

In one embodiment, the message composer (121) has an existing, native mechanism for displaying suggestions (e.g., making suggestions based on address set (111)). The profile presenter (125) is configured to obtain the suggestions from the native mechanism (e.g., via scraping, inspecting, querying, etc.) and displays the suggestions above the separator (121).

In one embodiment, the suggestions presented above the separator (211) are identified by the message composer (121). The profile presenter (125) obtains the suggestions from the message composer (121), presents the suggestions in the suggestion window (205), hide the suggestions the message composer (121) would have shown (and thus prevents the message composer (121) from presenting the suggestions in a separate window).

In another embodiment, the profile presenter (125) shows the suggestions based on the profile set (113) in one suggestion window; the message composer (121) shows the suggestions in a different suggestion window; and the profile presenter (125) aligns its suggestion window with the suggestion window of the message composer (121) so that the two suggestion windows appear like two panels of a large window. Alternatively, the profile presenter (125) presents its suggestion window over the suggestion window of the message composer (121) (to cover up and thus effectively disable the suggestion window of the message composer (121)). In one embodiment, the profile presenter (125) causes the suggestion window of the message composer (121) to be invisible on subsequent invocations to hide the suggestion window of the message composer (121).

In another embodiment, the profile presenter (125) uses the address set (111) to identify the suggestions presented above the separator (211) in the suggestion window (205), using the same approach the suggestion window of the message composer (121) would use.

In one embodiment, the profile presenter (125) includes an auto suggest manager. The auto suggest manager can turn on or turn off the feature of auto suggestions generated based on the profile set (113) in accordance with the preferences of the user. The auto suggest manager provides encapsulation, providing an easy interface for external applications to use the auto suggest feature without understanding its implementation. It provides mechanisms to add the auto suggest feature to a new window (message, contact, etc.), to "clean up" or remove the auto suggest feature from a window or all windows, to allow logging of auto suggest state and problems, and to determine any special preferences the user may have set in the native client (e.g., Outlook).

In one embodiment, the profile presenter (125) includes a suggestion window (205) that presents a dialog box or a list box to show the suggested results. The profile presenter (125) includes a view controller to show or hide the suggestion window (205). The view controller also positions the suggestion window (205) in the correct location (which varies as the user types in text), participates in "hiding" the suggestion window (205) from the native application (e.g., Outlook) so that the native application is not aware of the existence of the suggestion window (205), and notify other modules of navigation commands (PgUp, PgDown, etc.) and user selections. When a selection or keyboard command (e.g., arrow keys, tab return) related to the suggestions occurs, the suggestion window (205) (or a keyboard hook or the inspector controller, discussed below) provides messages to the view controller for processing.

In one embodiment, the profile presenter (125) further includes a result controller, which decides what results to show and when. After the profile presenter (125) detects that the user is typing in an address field (e.g., To, CC, or BCC fields of a window to compose an email), the result controller uses the incomplete input as a search criterion to search for the suggestions based on the profile set (113) and/or based on the address set (111). The view controller causes the display of the suggestion window (205) to show the search results. If the user selects a suggestion from the window (205), the address corresponding to the user selection is put into the address field.

In one embodiment, the profile presenter (125) is implemented as an add-on module for an existing communications client, such as Microsoft Outlook, which can make suggestions by selecting from the address set (111) the email addresses that start with the incomplete input typed by the user in the address field. The suggestion window (205) of the profile presenter (125) subclasses the suggestion window of the existing communications client; and the profile presenter (125) hides the suggestion window of the existing communications client and creates a keyboard hook as wells as a subclass mechanism using code-injection to intercept keyboard messages and other messages sent to the hidden suggestion window of the existing communications client to prevent it from processing these keys (e.g. PgUp, PgDown, Tab, Return), and also to cause it to process fake keystrokes or other messages (e.g. to implement "delete" functionality"). In one embodiment, the keyboard hook is a global WH_KEYBOARD_LL hook; in another embodiment, the keyboard hook is a WH_KEYBOARD hook. In one embodiment, the profile presenter (125) creates only one such keyboard hook per thread (especially for the WH_KEYBOARD hook).

In one embodiment, the result controller is configured to handle a rapidly typing user, by stopping a previous search and then starting a new search. For example, if a search for suggestions is started based on the initial input "er" and before the suggestions are displayed the user further typed "ic" to provide the input "eric", the result controller stops the search for suggestions based on "er" and starts a new search for suggestions based on "eric".

In one embodiment, an inspector controller is used to hook the functionalities of the profile presenter (125) with the existing communications client, which may be the message composer (121) in one embodiment. When a window for the message composer (121) is constructed and shown, the inspector controller determines whether the user is typing in a field (e.g., entry box (203)) that is configured to receive an address. If the user is typing in an address field, the inspector controller instantiates a keyboard hook to obtain what the user types in the address field to allow the profile presenter (125) to generate the suggestions based on the profile set (113).

In one embodiment, the inspector controller determines if the window should have auto suggest functionality. Read-only windows or unsupported type of windows should not have the auto suggest functionality. The inspector controller then searches for suitable textboxes (using a "Control Calculation mechanism") that should have auto suggest functionality attached to them. Since the native client (e.g., Outlook) has many configurations ("use Word Editor", use "RTF Editor", etc.), different mechanisms are used and a fallback mechanism in case the initial search for a suitable window fails, and in some cases, additional code injection is required because the native client (e.g., Outlook) uses a different process for different windows. The inspector controller uses a "SetProp" mechanism to "remember" which windows have already been subclassed so that auto suggest functionality is correctly added to the newest window. Additionally, the inspector controller keeps track of which textbox (To, Cc, Bcc, etc.) the user is currently using. The inspector controller also is responsible for putting the user's selection (from the dialog) into the selected textbox control. The inspector controller also watches for various windows message in the various subclassed windows (e.g. Activation, Focus, Keyboard), "hiding" (or "eating") some of these message from the native client (e.g., Outlook) so as not to break other existing functionality of the native client (e.g., Outlook), and using others to notify the view controller that it should hide or show or change the suggestion window (205). In addition to the subclass of the "TextBox" and "Outlook AutoSuggest" window, the main composer window is subclassed as well, and may subclass others in the future. This subclassing mechanism is implemented using code injection, but may also be implemented using other mechanisms. Code injection "injects" code into another program (e.g. Outlook or Word) while it is running.

In one embodiment, the inspector controller subclasses the textbox (and also the parent window) into which the user is typing to receive the keys typed by the user, generate requests for new suggestions in response to keys typed by the user, scroll through the suggestions (e.g., when the user presses arrow keys), indicate a selection by the user (e.g., when the user presses Tab or Enter key) (some embodiments use subclass, some embodiments keyboard hook), the profile presenter (125) hide these keystrokes from the native client (e.g., Outlook window) (by "eating" or consuming the messages), and hide the suggestion window (205) when the keyboard focus is moved out of the textbox or user has activated another application or user has finished selection. The inspector controller instantiates the view controller to process the user input and subclasses the suggestion window of the message composer (121) to create the suggestion window (205). The inspector controller (or the keyboard hook) contacts the view controller to process the user inputs when various keys are received in the textbox in which the user is typing.

In one embodiment, a window driver is used to work with the message composer (121) to obtain current caret position (the position of the text insertion point indicator). In response to the requests from the inspector controller and the suggestion window (205), the window driver may selectively block messages from being passed on to other windows. When a selection is made, the window driver is configured to replace the incomplete input in the address field with the address corresponding to the selection.

In one embodiment, the profile presenter (125) is implemented as an add-on module to a native client, such as Outlook. The Outlook textbox windows are in some cases "rich edit controls" which allow other controls to be embedded in them. The profile presenter (125) walk both the text and these embedded COM controls using COM (also known as OLE or ActiveX programming) to determine where the user is currently entering text (ignoring any other text or embedded controls before or after the current email address) so that the profile presenter (125) can correctly determine where the current user's entry begins and ends, what text to use to create suggestions for, and also which part of the text (or embedded controls) to replace.

In one embodiment, the profile presenter (125) uses a person-centric approach to identify the suggestions. The partial input (e.g., "Graf" received in the entry box (203)) is used to match the names of the persons to identify the persons in the profile set (113) (e.g., the first name, the last name, the nickname, etc.). The profile presenter (125) sorts the matched persons based on a relationship score determined from the statistical data derived at least in part from the received messages (115) and the sent messages (117).

In one embodiment, after receiving one or more letters that are typed in by an end user in an entry box configured to receive an address for an outgoing message, the profile presenter (125) determines whether the one or more letters match part of a name in the profile set (113). If there is a match (or more than one match), the profile presenter (125) retrieves the addresses associated with the matched name(s), sorts the addresses, and presents the addresses for selection in suggestion window (205).

In one embodiment, if there is no name that matches the one or more letters, the profile presenter (125) determines whether the one or more letters match part of an address in the profile set (113). If there is a match (or more than one match), the profile presenter (125) retrieves the matched address(es), sorts the addresses, and presents the addresses for selection in suggestion window (205).

Thus, the user can input the names of the recipient to cause the profile presenter (125) to identify the persons with names matching the input to select the person and thus select the address of the person. The names of the recipient do not have to be part of the addresses to be matched and suggested.

In one embodiment, when a person has multiple addresses, the suggestion window (205) shows multiple suggestions for the addresses presented with the name of the person.

In another embodiment, when a person has multiple addresses, the suggestion window (205) shows one entry to suggest the person. If the person is selected, the suggestion window (205) is then updated to show a list of addresses of the person. If the user selects one or more addresses, the profile presenter (125) replaces the name of the person with the selected address(es) of the person; if the user does not select any of the multiple addresses, the profile presenter (125) replaces the name of the person with all of the multiple addresses. In one embodiment, if the user does not select any of the multiple addresses of the person, the profile presenter (125) replaces the name of the person with the top ranked address of the person in the To field and inserts the other addresses of the person in the CC or BCC field (or uses the top ranked address without using the other addresses of the person).

In one embodiment, the profile presenter (125) attempts to first match names of the persons in the profile set (113) and, if there is no match in names, then match addresses of the persons in the profile set (113).

In another embodiments, the profile presenter (125) may perform a search to match the beginning of a number of fields in the profile set (113), such as, different fields of names of the persons in the profile set (113), different segments of email addresses of the persons in the profile set (113), the names of cities (or states or countries) of the persons in the profile set (113), different words in the street addresses of the persons in the profile set (113), different words of job titles of the persons in the profile set (113), screen names of the persons in the profile set (113), etc. Examples of different fields of names include first name, last name, middle name, nick name, etc. Examples of different segments of email addresses include segments or chunks of an email prefix separated by a separator, such as "-", ".", or "_", different levels of domain names of an email address, etc. In some embodiments, the names of the persons are as part of the email addresses. In some embodiments, the names are from fields separated from the email addresses.

When the profile presenter (125) searches different types of fields, a match in different types of fields may be weighted differently. For example, a match in a name field may be given a first weight (e.g., 10), a match in an email prefix segment may be given a second weight (e.g., 8), a match in the top level domain name may be given a third weight (e.g., 1), and a match in other domain names (e.g., second level domain name, or lower level domain names) may be given a fourth weight (e.g., 2), etc. When a person or an address has multiple matches in different fields, the weights for the multiple matches may be added to compute the weight for the person or address. Alternatively, the highest weight for the multiple matches can be selected as the weight for the person or address. The weights for the matched persons or addresses can be used to sort the persons or addresses for selection of up to a predetermined number of suggestions for presentation to the user. For example, the weights can be applied to the relevancy scores of the matched persons or addresses to determine relevancy scores for suggesting the persons or addresses; and the profile presenter (125) selects up to a predetermined number of matched persons or addresses that have the highest relevancy scores for suggesting the persons or addresses.

In FIGS. 4 and 5, the suggestions presented based on the profile set (113) are shown as a list of entries, where a typical entry includes the name and the address of the person. However, in other embodiments, the entries may further include other information, such as a photo image of the person, a job title of the person, a business association of the person, etc. In some embodiments, other details of the profile of the person are shown in a separate window when the cursor is positioned and remains positioned on the entry for the person (e.g., hovering over the entry).

In one embodiment, the profile presenter (125) ranks the persons for the suggestions to complete the address input, based on the relevancy index between the suggested persons and the user of the user terminal (101). When dealing with long lists of contacts, such a relevancy index helps users find the most relevant contacts first.

In one embodiment, the profile builder (119) scans the messages (115 and 117) to capture the addresses of the senders and recipients of the messages (115 and 117). Each of the captured addresses is stored in an index file. When one of those addresses is seen in a header that describes the recipients and senders, the score for the address is increased by a predetermined amount (e.g., 1). In some embodiments, the profile builder (119) further scans the body of the messages (115 and 117) to identify additional addresses.

In some embodiments, different weights/amounts are given to the score when the addresses are used in different fields (e.g., From, Reply-To, To, CC, and BCC fields of emails). For example, an amount of 3 may be given to the score when an address is found in a field that identifies the sender of the message (e.g., From or Reply-To fields of emails received by the user of the user terminal (101)); and an amount of 1 may be given to the score when the address is found in a field that identifies the recipient of the message (e.g., To, CC, and BCC fields of emails sent from the user of the user terminal (101)).

In some embodiments, the same amount is given to the score regardless of the type of fields in which the address is used (e.g., From, Reply-To, To, CC, and BCC fields of emails).

In some embodiments, the length of the elapsed time period since receipt of the message is further used to determine the amount given to the score. The occurrence of an address in a recent message can be given more weight than the occurrence of the address in a message received/sent earlier than the recent message.

Thus, after the messages (115 and 117) are processed, each of the addresses has a relevancy score. The higher the score, the more relevant the address is to the user of the user terminal (101).

In some embodiments, the relevancy score is computed from the data in the profile (131), such as the total number of messages received from the person (148), the total number of messages sent to the person (149), etc. In some embodiments, the number of messages are counted based on the types of fields in which the addresses appear and the time periods in which the messages are sent or received.

In one embodiment, the profile builder (119) further groups the addresses by the names of the corresponding persons. Each person having a name in the profile set (113) may have one or more addresses. In one embodiment, the scores for the addresses of the person are summed to generate a score for the person. Thus, the higher the score, the more relevant the person is to the user of the user terminal (101).

In one embodiment, when the suggestions are presented as a list of addresses, the scores for the addresses are used to sort the addresses. When the suggestions are presented as a list of persons, the scores for the persons are used to sort the list of names of the persons.

In another embodiment, the suggestions are presented as a list of addresses grouped according to the persons. The addresses for each person are grouped together and sorted within the group based on the scores of the emails. The groups are sorted according to the scores of the persons.

In one embodiment, the profile presenter (125) selects up to a predetermined number (e.g., 10) of candidates, after sorting the candidates for the suggestions based on the relevancy scores. The selected candidates are presented in the suggestion window (205) to help the user. Less relevant candidates are not presented in the suggestion window (205).

While some of the embodiments are discussed here in the context of composing an email message, the techniques disclosed here can also be applied to the specifying of address information for instant messaging, text messaging, dialing a phone number, etc. Instead of matching the incomplete input to the exact address, the profile presenter (125) can match the incomplete input with identifiers of the persons in the profile set (113) to identify the persons as the basis for suggestions. Examples of identifiers include nickname, first name, last name, company name, domain name, user name, screen name, phone number, etc. In one embodiment, the suggestions are searched and presented in the form of suggested persons and thus, the suggestions are person-centric.

In some embodiments, the user terminal (101) may include different communication components that require address information for different types of communications, such as email, instant messages, text messages, phone calls, etc. The profile presenter (125) may use the profile set (113) to generate the suggested candidates for completing an address input for the different types of communications.

In some embodiments, the relevancy score is computed for the person without considering the type of communications. In other embodiments, the addresses having the same type as the address to be suggested are given more weight than other types of addresses. For example, when ranking the persons for suggesting addresses for instant messaging, the addresses for instant messaging may be given more weight than addresses for other types of communications, such as email, phone calls, etc. Thus, for different types of communications, the profile presenter (125) may suggest different lists of persons based on the same profile set (113) and the same incomplete input.

In one embodiment, the profile builder (119) scans a set of messages (115 and 117) to identify addresses of senders of the messages and addresses of recipients of the messages in an automatic way, for example, when the profile builder (119) is installed and/or when the messages (115 and 117) are received or sent.

The profile builder (119) identifies the names of persons at the addresses to create profiles (131) for the persons, based on scanning the messages (115 and 117) and/or querying other data sources in an automated way, such as the web search engine (163), online directory (164), social network server (165), and other websites.

In one embodiment, the profile builder (119) computes a relevancy score for each of the addresses based on a number of messages in which the addresses are used and types of fields in which the addresses are used in the messages. For example, instances where an address is used to specify a recipient of a message sent from the user of the user terminal (101) may be given more weight than instances where the address is used to specify a sender of a message received by the user of the user terminal (101).

In one embodiment, the profile builder (119) also computes a relevancy score for each of the persons based on the relevancy score of the addresses of each person.

In one embodiment, in response to an incomplete input in an address field, the profile presenter (125) identifies a set of persons by matching the incomplete input with names of the persons and/or the addresses of the persons. The profile presenter (125) sorts the addresses of the identified persons according to the relevancy scores of the persons and/or the relevancy scores of the addresses, and selects and presents up to a predetermined number of suggestions from the sorted addresses. In response to a user selection of one of the suggestions, the profile presenter (125) replaces the incomplete input with the user selected address.

Figure 6:
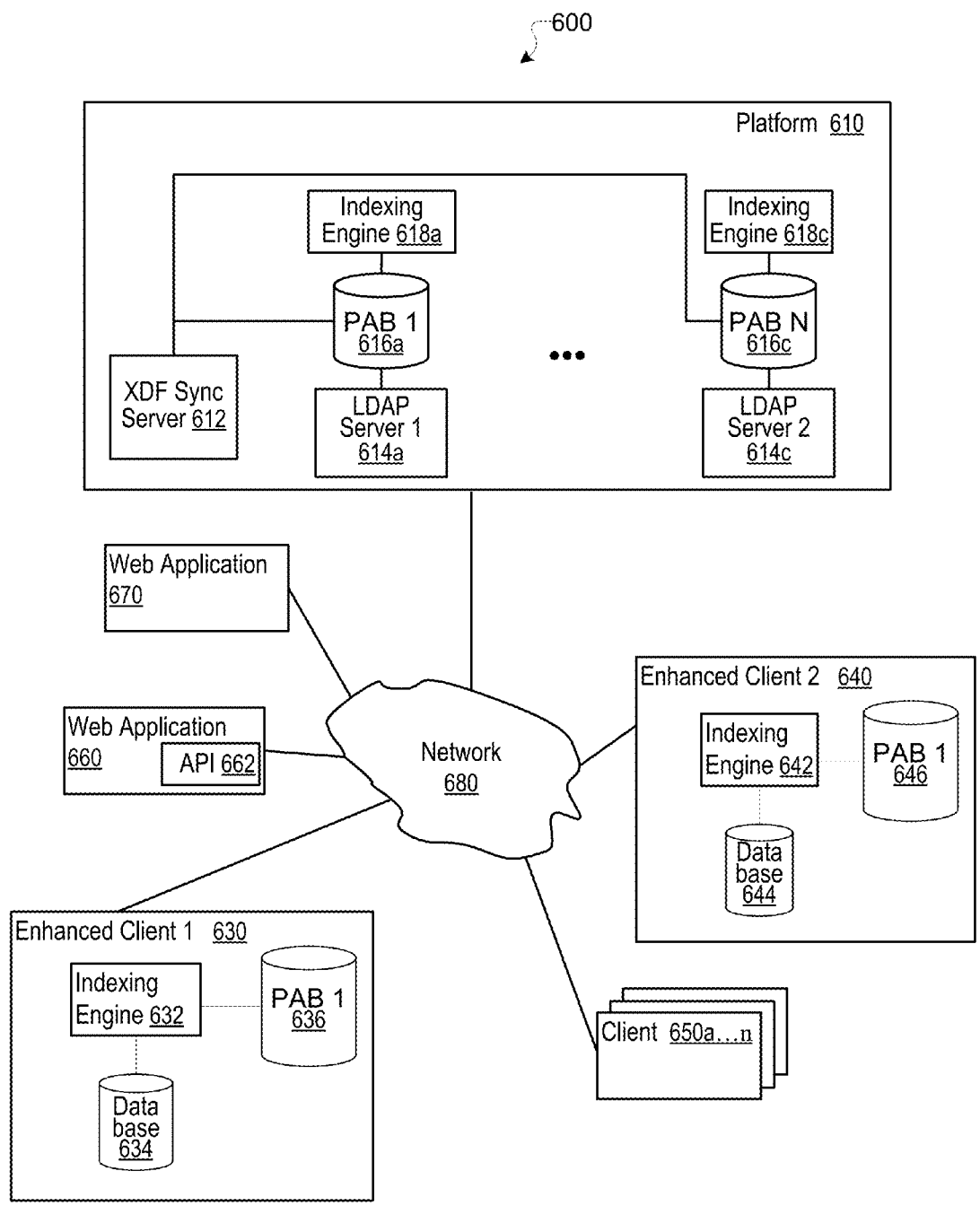
FIG. 6 shows a system to provide server side profile information according to one embodiment.

FIG. 6 illustrates a system (600) having an enhanced client 1 (630), an enhanced client 2 (640), clients (650a-n), web application (660), web application (670), and a platform (610). The components in FIG. 6 communicate over a network (680). In one embodiment, the network (680) is the network (151).

The enhanced client 1 (630) is a client application that runs on the user terminal (101) of a particular user, and provides the functionality of the components (111-125). The enhanced client 1 (630) may include any software utility or client application that provides for management of messages, address books, contact information, and calendars including, for example, those provided by Microsoft (e.g., Outlook), RIM (e.g., Blackberry), and other organizations. In one embodiment, the enhanced client 1 (630) may include other types of software utilities and client applications.

In one embodiment, the enhanced client 2 (640) may include the same types of software utilities and client applications as the enhanced client 1 (630).

The enhanced client 1 (630) includes a database (634), an indexing engine (632), and a passive address book (PAB) 1 (636). The database (634) may include contact information in a native data format of the client application, including, for example, received messages (115), sent messages (117), and contact information manually entered by a user of the user terminal (101). In one embodiment, the database (634) may include information in the address set (111).

The indexing engine (632) extracts, processes, and indexes information from the database (634), and stores the information in the PAB 1 (636). In one embodiment, the indexing engine (632) is, or may include, the profile builder (119). In one embodiment, the profile information in the PAB 1 (636) may include information in the profile set (113). In this regard, the PAB 1 (636) contains profile information about persons obtained from the headers of sent messages and received messages that are manually entered as well as information automatically obtained from the bodies of messages and various online sources. In one embodiment, the functionality of the indexing engine (632) and the PAB 1 (636) may be provided by an add-on utility to a base client application.

In one embodiment, the enhanced client 1 (630), as well as the platform (610) via the indexing engines (618a) and (618c), may additionally extract profile information over the network (680) from a separate web application (670) (e.g., Google account of the user) of a remote server by a custom communications protocol between the enhanced client 1 (630) and the web application (670). In one embodiment, the enhanced client 1 (630)), as well as the platform (610) via the indexing engines (618a) and (618c), may extract profile information over the network (680) from a separate web application (660) (e.g., Yahoo account of the user) of a remote server via an API (662) with which to extract the profile information from the web application (600). The profile information is stored in the PAB 1 (636).

The enhanced client 1 (630) communicates with the platform (610) over the network (680). In one embodiment, the platform (610) is a server or server farm. The platform (610) includes an XDF sync server (612), an indexing engine (618a), a PAB 1 (616a), and an LDAP server 1 (614a). The indexing engine (618a), the PAB 1 (616a), and the LDAP server 1 (614a) are associated with the user of the enhanced client 1 (630) and the enhanced client 2 (640). In one embodiment, the indexing engine (618a), the PAB 1 (616a), and the LDAP server 1 (614a) are provided for the user or group of users. An indexing engine (618c), a PAB N (616c), and an LDAP server N (614c) of the platform (610) are provided for a different Nth user or group of users.

The information in the PAB 1 (636) of the enhanced client 1 (630) may be uploaded to the platform (610) and synchronized with the information in the PAB 1 (616a) in the platform (610). During a synchronization process, the profile information in the PAB 1 (636) may be used to create and package a data file. In one embodiment, the data file is formatted in JSON. The data file may contain a plurality of entries with each entry having profile information for various individuals including, for example, name, email address, phone number, title, position, employer, social network account identification, as well as any other desirable profile information. After the data file is packaged, the enhanced client 1 (630) provides the data file to the XDF sync server (612). The XDF sync server (612) analyzes the profile information in the PAB 1 (616a). If the PAB 1 (616a) has no profile information, the XDF sync server (612) copies the information from the data file into the PAB 1 (616*a*). If the PAB 1 (616*a*) already has profile information, the XDF sync server (612) synchronizes the information from the data file with the profile information in the PAB 1 (616*a*) to generate synchronized profile information and to accordingly update the PAB 1 (616*a*). In one embodiment, the synchronization process occurs automatically and regularly. In one embodiment, the user may initiate the synchronization process.

In one embodiment, the information in the PAB 1 (616*a*) of the platform (610) may be downloaded (i.e., served) to the enhanced client 1 (630) and synchronized with the information in the PAB 1 (636) in the enhanced client 1 (630). During a synchronization process, the information in the PAB 1 (636) may be used to create and package a data file. In one embodiment, the data file is formatted in JSON. The data file may contain a plurality of entries with each entry having profile information for various individuals including, for example, name, email address, phone number, title, position, employer, social network account identification, as well as any other desirable profile information. After the data file is packaged, the enhanced client 1 (630) provides the data file to the XDF sync server (612). The XDF sync server (612) analyzes the profile information in the PAB 1 (616*a*) and compares it with the data file. The platform (610) generates a new data file reflecting the results of the comparison between the profile information in the PAB 1 (616*a*) and the data file created from the PAB 1 (636). The new data file is provided to the enhanced client 1 (630) and the stored in the PAB 1 (636).

The enhanced client 2 (640) is another exemplary client application that runs on the user terminal (101) of a different device for the user, and also provides the functionality of the components (111-125). In one embodiment, the enhanced client 1 (630) and the enhanced client 2 (640) are different client applications that run on different user terminals (101). The enhanced client 2 (640) includes a database (644), an indexing engine (642), and a PAB 1 (646). With respect to the synchronization process and communication with the LDAP server 1 (614*a*), the operation of the enhanced client 2 (640) is similar to the operation of the enhanced client 1 (630), as described herein. Thus, the description of the enhanced client 1 (630) and its operation applies, as is appropriate, to the enhanced client 2 (640) and its operation, and vice versa.

In one embodiment, updates to the PAB 1 (636) of the enhanced client 1 (630) may be propagated to the enhanced client 2 (640), and vice versa. For example, an update to the PAB 1 (636) of the enhanced client 1 (630) may be uploaded to the platform (610) during a synchronization process. During a synchronization process between the platform (610) and the enhanced client 2 (640), the update may be downloaded to the enhanced client 2 (640).

The clients (650*a-n*) are client applications that run on the user terminal (101) of the user. In one embodiment, the clients (650*a-n*) are all configured to have LDAP support. The clients (650*a-n*) may include any software utility or client application that provides for management of messages, address books, contact information, and calendars including, for example, those provided by Microsoft (e.g., Outlook), Apple (e.g., mail and address book applications for iPhone; mail.app and address book for Mac; OS X, etc.), RIM (e.g., Blackberry), and other organizations. In one embodiment, the clients (650*a-n*) may include other types of software utilities and client applications. A local database (not shown) for each of the clients (650*a-n*) may include information in a native data format of the client application, including, for example, received messages (115), sent messages (117), and contact information manually entered by a user of the user terminal (101). In one embodiment, unlike the enhanced client 1 (630) and the enhanced client 2 (640), the clients (650*a-n*) of the user do not include a PAB 1.

In one embodiment, an LDAP server of the platform (610) may separately store data for multiple users supported by the platform (610). For example, to communicate with the clients (650*a-n*) of the user, the platform (610) includes the LDAP server 1 (614*a*) for the user or a group of users. The platform (610) includes the LDAP server N (614*c*) for the Nth user or group of users supported by the platform (610). In one embodiment, separate LDAP servers may be partitioned in the platform (610) by using OpenLDAP Software and/or other LDAP or directory-service software. In one embodiment, the LDAP server 1 (614*a*) is provisioned to the user after the enhanced client 1 (630) has synchronized the profile information in the PAB 1 (636) with the PAB 1 (616*a*) of the platform (610). In one embodiment, the user may be provided access to more than one LDAP server and the profile information in the corresponding PABs. In one embodiment, the platform (610) may include a dedicated LDAP server for every user supported by the platform (610).

As discussed in more detail below, the LDAP server 1 (614*a*) may be accessed by the user through LDAP configuration settings unique to the user. In one embodiment, login information of each user when provided to the platform (610) permits the user to access only the LDAP server 1 (614*a*), and associated profile information in the PAB 1 (616*a*), so that the profile information in the PAB 1 (616*a*) serves as a private data repository for the user. After the LDAP configuration settings for the user are provided to the platform, the platform (610) may provide (i.e., serve) profile information from the PAB 1 (616*a*) via the LDAP server 1 (614*a*) during use by the user of any of the clients (650*a-n*). For example, when the user provides a partial entry of contact information in a field of the client (650), the LDAP server 1 (614*a*) may provide profile information to the client (650) as a suggestion for the partial entry.

Figure 7:
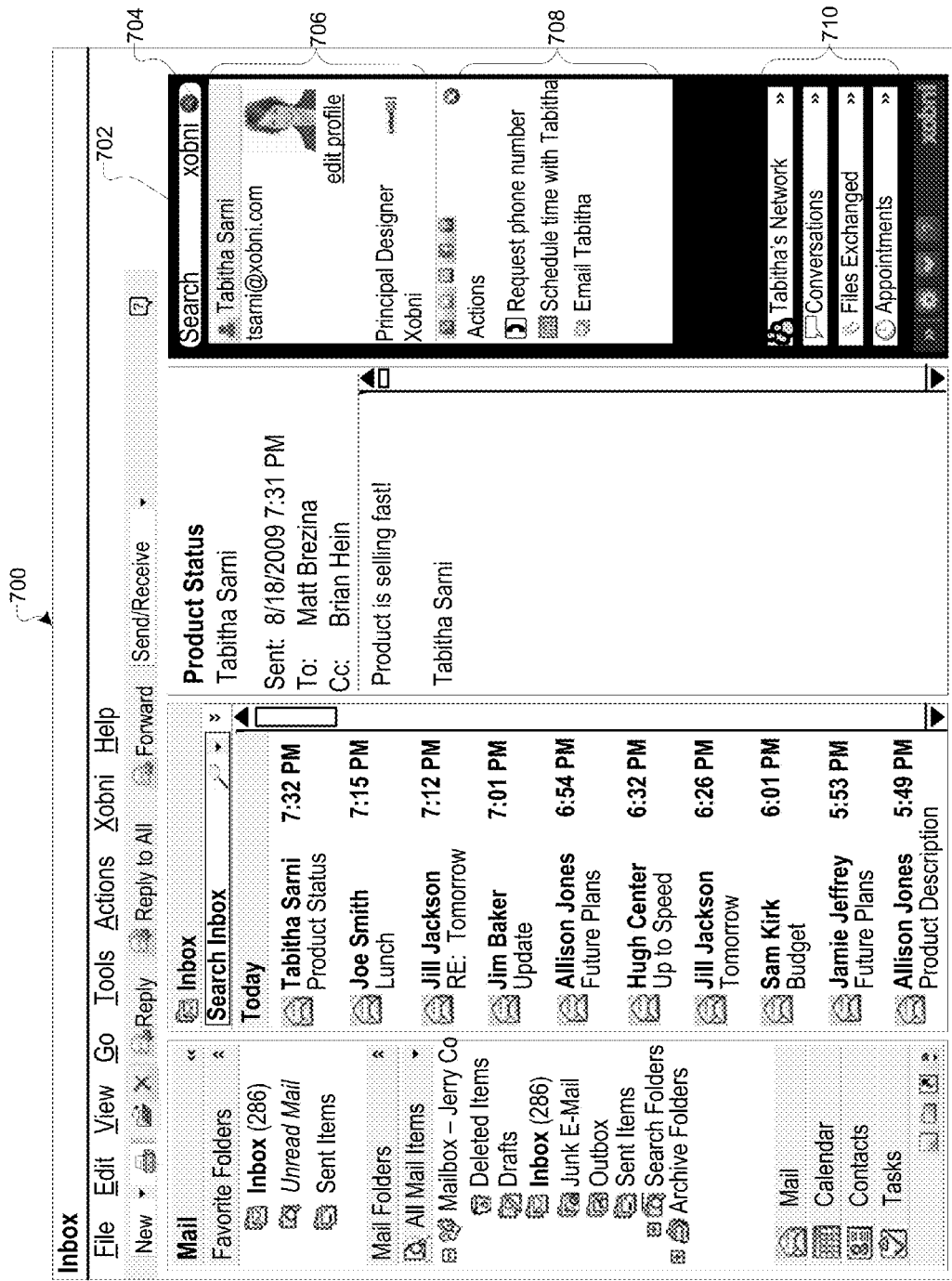
FIG. 7 shows a screen of an enhanced client according to one embodiment.

FIG. 7 illustrates an exemplary screen (700) of the enhanced client 1 (630) of the user. The user interface (700) includes a panel (702) that reflects the ability of the enhanced client 1 (630) to perform the functionality of the components (111-125). The panel (702) includes a search box (704) to perform searches against the PAB 1 (636). The panel (702) includes a profile section (706) that provides information about a contact of interest to the user. The panel (702) includes an actions section (708) to allow the user to perform various actions, such as request a phone number of the contact, schedule time with the contact, and email the contact. The panel (702) includes a utilities section (710) to allow the user to, for example, see the network of the contact, and view conversations, files exchanged, and appointments of the user.

Figure 8:
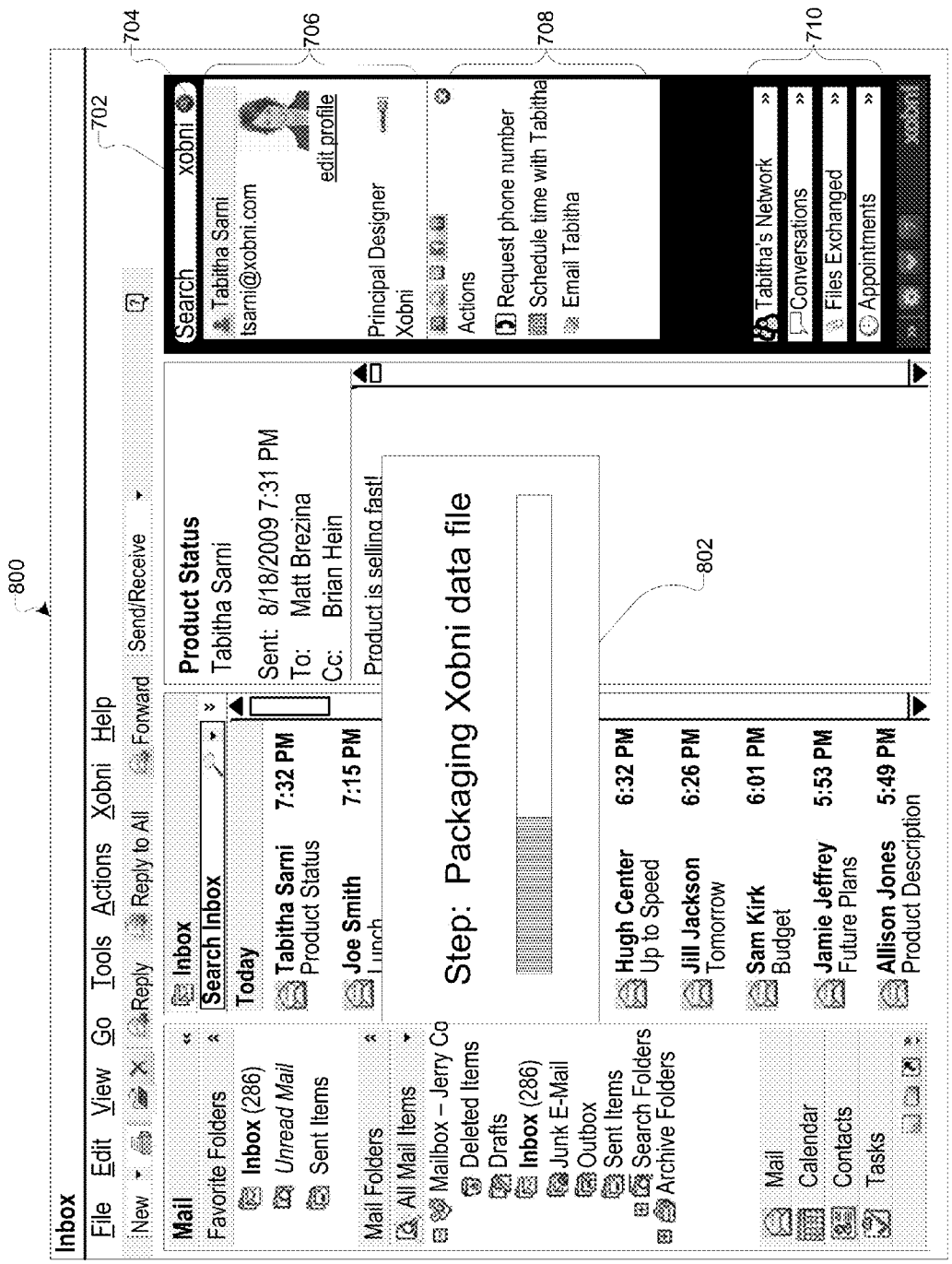
FIG. 8 shows a screen related to packaging of a data file according to one embodiment.

FIG. 8 illustrates a screen 800 of the enhanced client 1 (630) having a pop-up window (802) that indicates the packaging of a data file in a synchronization process between the enhanced client 1 (630) and the platform (610). In one embodiment, the synchronization process is automatically initiated. In one embodiment, the synchronization process may be initiated by the user or by the platform (610) or both. As part of the synchronization process, the profile information in the PAB 1 (636) may be used to create and package a data file to provide to the XDF sync server (612). In FIG. 8, the process of packaging the data file is indicated to the user via the pop-up window (802). Once the packaging is complete, the data file is provided to the platform (610) to continue the synchronization process so that the profile information in the PAB 1 (636) of the enhanced client 1 (630) may be provided to the PAB 1 (616a) of the platform (610), as discussed above.

Figure 9:
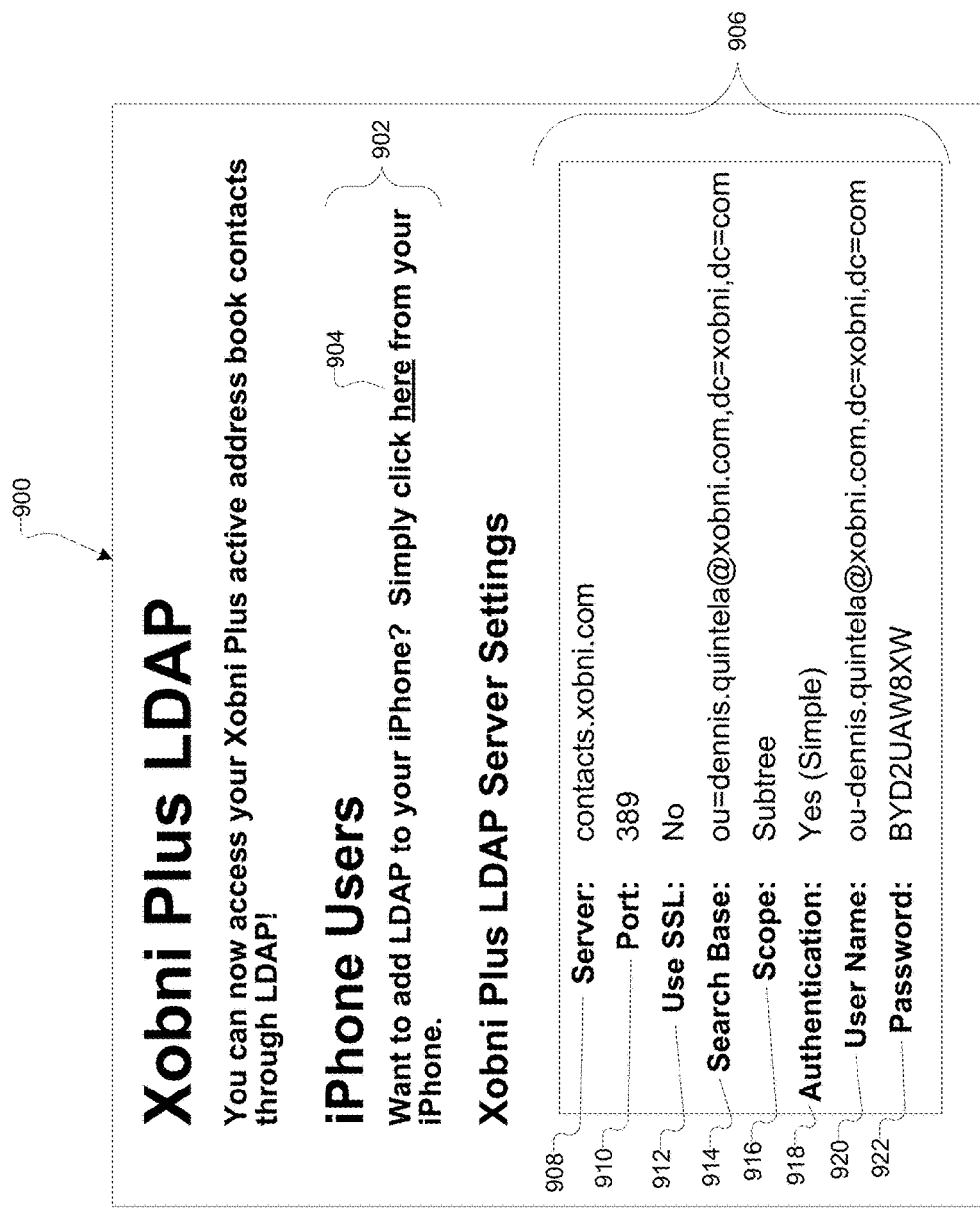
FIG. 9 shows a screen providing configuration settings data according to one embodiment.

FIG. 9 illustrates an exemplary screen (900) of the client (650) to configure the client (650) to allow communication with the LDAP server 1 (614a) that supports the user. In one embodiment, the screen (900) is dynamically generated for the user after log in to the platform (610). Before configuration of the clients (650a-n), the LDAP server 1 (614a) has already been provisioned to the user. The screen (900) includes an automatic configuration section (902) that allows the user to click on a link (904) to automatically configure the settings related to the LDAP server 1 (614a) for the particular client (650) through use of a configuration file. In the illustrated embodiment, clicking on the link (904) automatically configures the client (650) for the LDAP server 1 (614a) when the client (650) is the iPhone. In one embodiment, other links may be provided to automatically configure the additional or alternate clients (605a-n) for the LDAP server 1 (614a).

The screen (900) also includes a configuration settings section (906). The configuration settings section (906) includes configuration settings data to allow communications with the LDAP server 1 (614a). The configuration settings data is to be manually entered by the user into the clients (650a-n) that may not have an associated link to automatically perform the configuration. In one embodiment, the configurations settings data is obtained from the configuration settings section (906), which includes a server field (908), a port field (910), an SSL field (912), a search base field (914), a scope field (916), an authentication field (918), a user name field (920), and a password field (922). The server field (908) indicates a DNS name or an IP address for a particular server associated with the platform (610). The port field (910) indicates a port number to which the client (650) will connect. The SSL field (912) indicates whether SSL will be used. The search base field (914) indicates the search base DN at or below which entries will be matched against a search operation. The scope field (916) indicates level of subtree of entries that should be considered when processing the search operation. The authentication field (918) indicates whether the access to the LDAP server 1 (614a) requires authentication. The user name field (920) indicates the user name assigned to the user. The password field (922) indicates the password of the user. In one embodiment, the user name and the password may be unique to each user.

In one embodiment, the values provided for the fields of the configuration setting section (906) may be different from those described and illustrated. In one embodiment, the configuration settings data and thus the configuration setting section (906) may contain additional or fewer fields. In one embodiment, the set of values in the fields of the configuration setting section (906) may be unique to each user.

Figure 10:
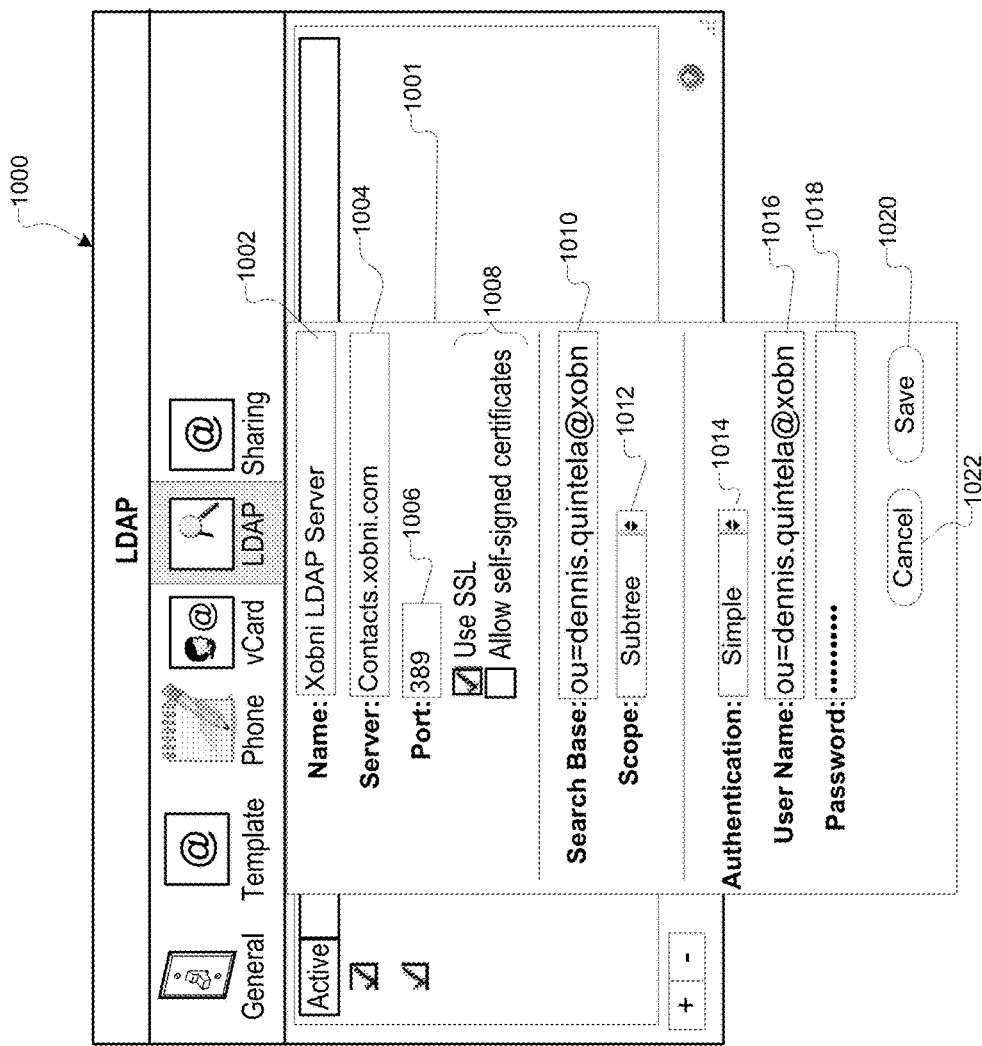
FIG. 10 shows a screen to allow a user to manually enter configuration settings data according to one embodiment.

FIG. 10 illustrates a window (1001) of a screen (1000) of the client (650) to allow the user to manually enter the configuration settings data so that the client (650) is configured to communicate with the LDAP server 1 (614a). The window (1001) includes a name field (1002), a server field (1004), a port field (1006), an SSL field (1008), a search base field (1010), a scope field (1012), an authentication field (1014), a user name field (1016), and a password field (1018). The name field (1002) indicates the name of the LDAP server 1 (614a) to which the client (650) will connect. As shown in FIG. 10, the configuration settings data have been manually entered into their respective fields of the window (1001) by the user. The user may click on a save button (1020) to save the entered configuration settings data. The user may click on a cancel button (1022) to exit from the window (1001).

Figure 11:
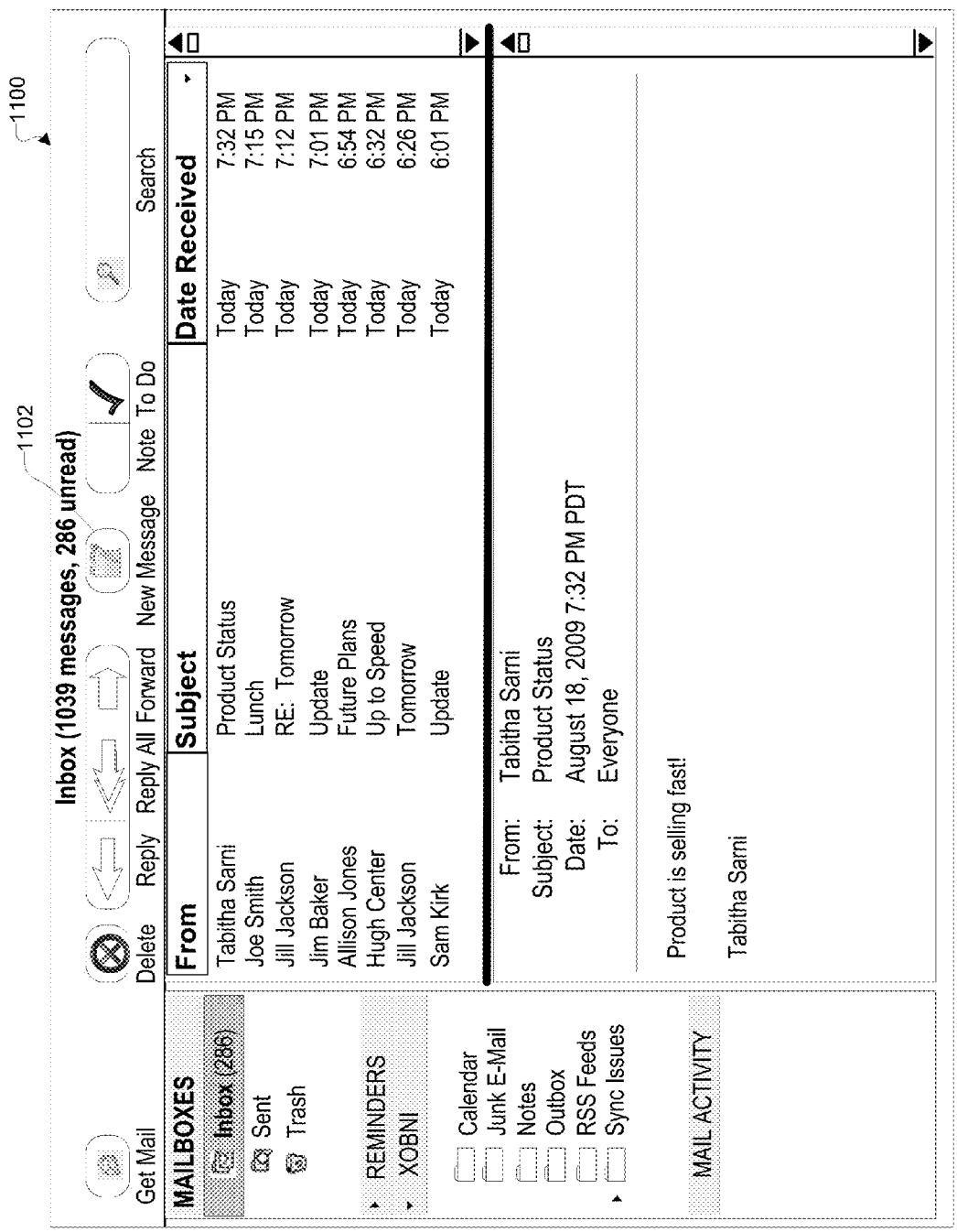
FIG. 11 shows a screen of a client according to one embodiment.
Figure 12:
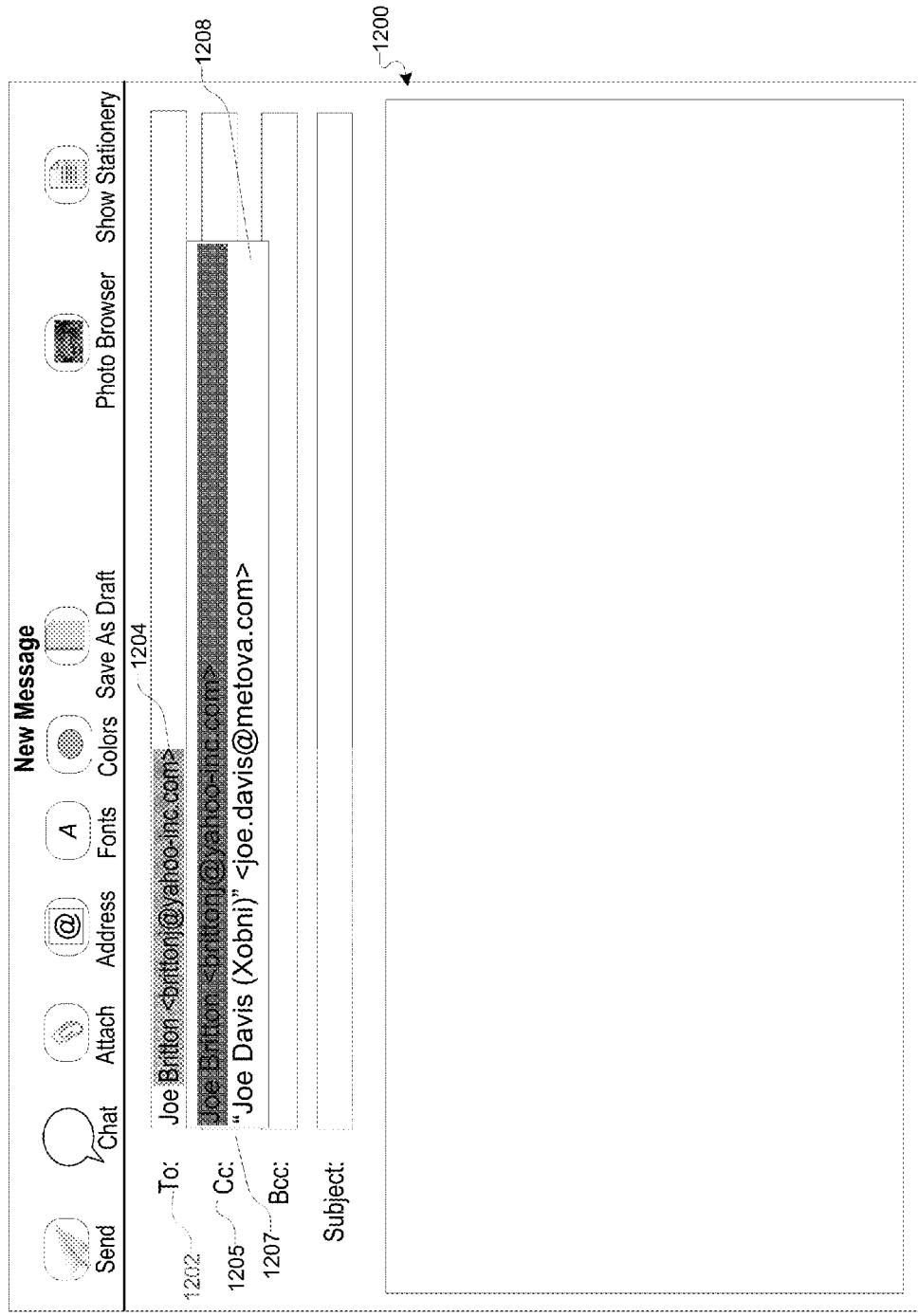
FIG. 12 shows a display of a suggestion served by an LDAP server and a suggestion provided by a client according to one embodiment.

FIG. 11 illustrates a screen (1100) of the client (650). In the illustrated embodiment, the client (650) is a mail application (e.g., mail.app). In one embodiment, the client (650) is another client application. When a new message button (1102) is clicked on by the user, a new message screen (1200) is displayed by the client (650), as shown in FIG. 12. The new message screen (1200) includes a To: field (1202), a Cc: field (1205), and a suggestion window (1207) that extends from the To: field (1202). In the illustrated embodiment, the user has provided the partial entry "Joe" in the To: field (1202) to address a message to a desired contact. Based on the partial entry "Joe", the client (650) provides a first suggestion (1204) of "Joe Britton <brittonj@yahoo-inc.com>" in the To: field (1202) as contact information potentially desired by the user. The first suggestion (1204) also appears in the suggestion window (1207). The first suggestion (1204) is provided by the local database of the client (650).

Based on the partial entry of "Joe", a second suggestion (1208) of "'Joe Davis (Xobni)'<joe.davis@metova.com> as profile information potentially desired by the user also appears in a second position in the suggestion window (1207). The second suggestion (1208) is provided from the LDAP server 1 (614a). In this way, the suggestion of contact information as the user enters data in a field of the client (650) may be supplemented by the LDAP server 1 (614a) even when, in contrast to the enhanced client 1 (630), the client (650) does not have a PAB 1.

In the illustrated embodiment, contact information provided by the LDAP server 1 (614a) is displayed below contact information provided by the local database of the client (650). In one embodiment, the profile information provided by the LDAP server 1 (614a) is sometimes or always displayed above contact information provided by the local database of the client (650).

In one embodiment, the profile information provided by the LDAP server 1 (614a), when displayed, is marked in any manner (e.g., "Xobni") to indicate the LDAP server 1 (614a) as its source. In one embodiment, the contact information provided by the local database of the client (650), when displayed, is marked in any manner to indicate the local database as its source. In one embodiment, the source of contact information and profile information, when displayed, is not indicated.

Figure 13:
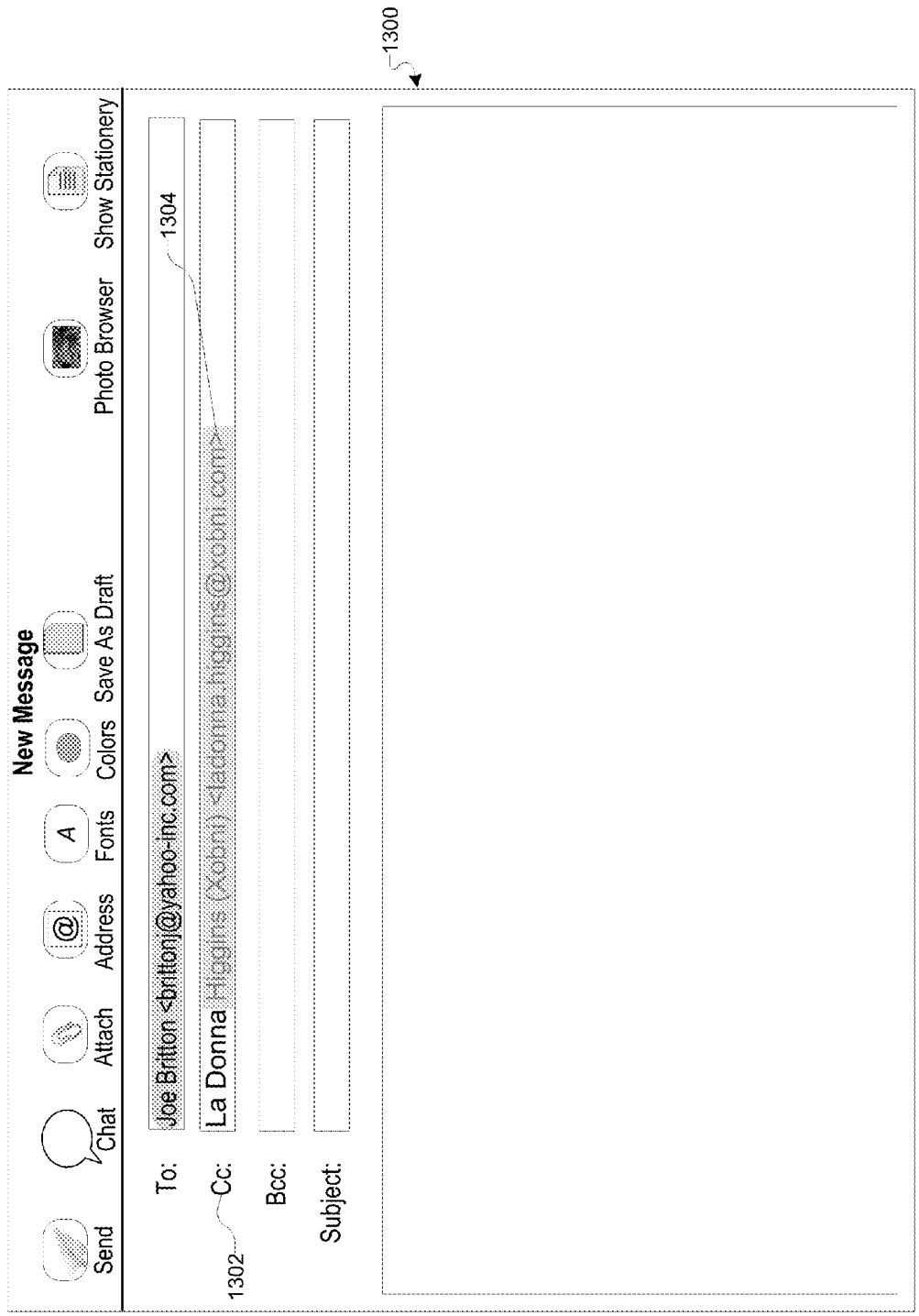
FIG. 13 shows a display of a suggestion served by an LDAP server according to one embodiment.

FIG. 13 illustrates a new message screen (1300) of the client (650). The new message screen (1300) includes a Cc: field (1302). In one embodiment, the new message screen (1300) is the new message screen (1200) after the selection of a contact desired by the user in the To: field (1202). In the illustrated embodiment, the user has provided the partial entry "La Donna" in the Cc: field (1302). Based on the partial entry "La Donna", the local database of the client (650) does not provide any suggestions as contact information potentially desired by the user. However, based on the partial entry "La Donna", the LDAP server 1 (614a) provides a suggestion (1304) of "La Donna Higgins (Xobni) <ladonna.higgins@xobni.com>" as profile information potentially desired by the user. The suggestion (1304) appears in the Cc: field (1302). Thus, even when the local database of the client (650) fails to provide suggested contact information, the LDAP server 1 (614a) may succeed in providing profile information to the client (650) to display as a suggestion for the user.

Figure 14:
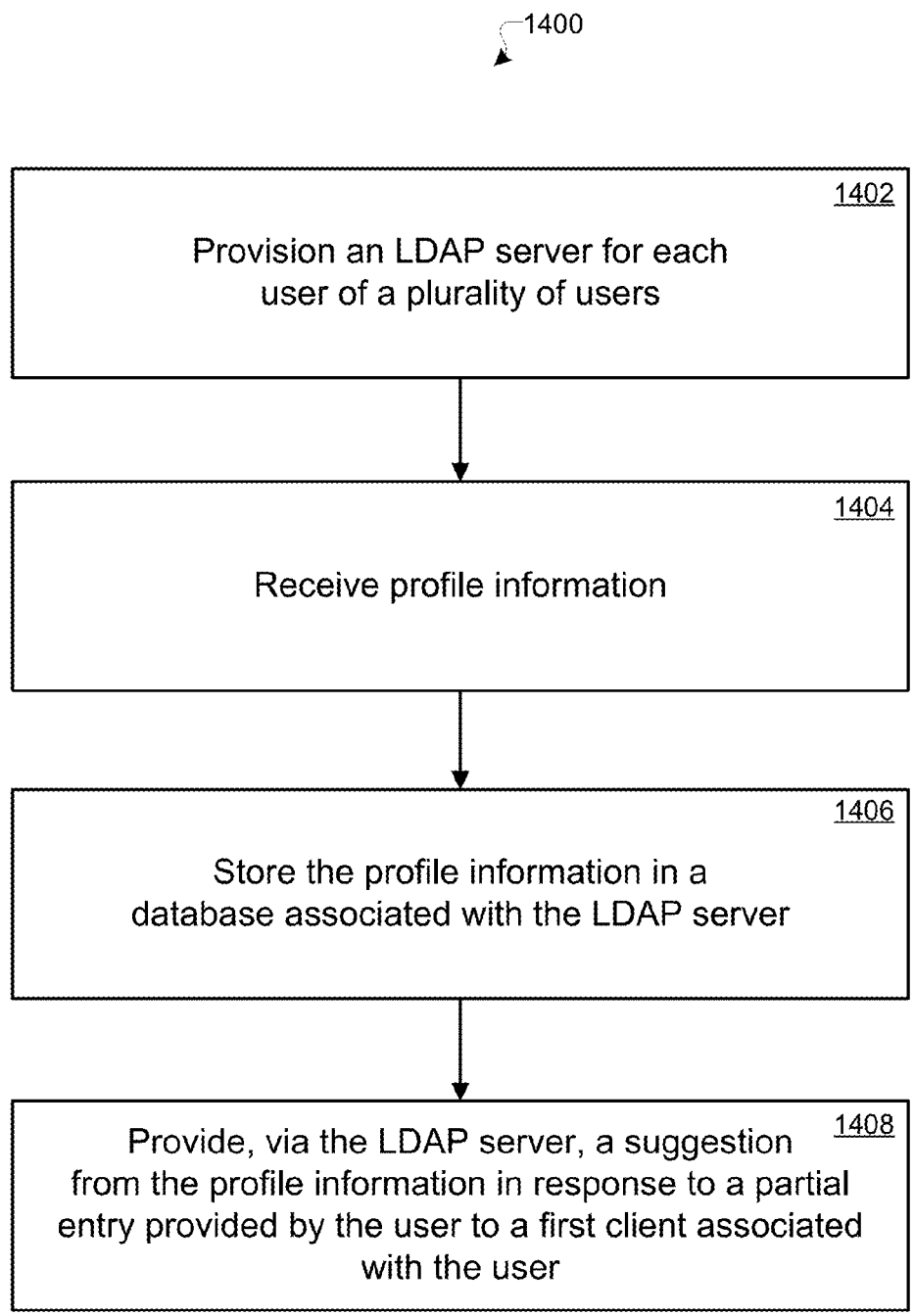
FIG. 14 shows a method to provide a suggestion to a client according to one embodiment.

FIG. 14 shows a flow chart (1400) for the client (650) to receive profile information from the LDAP server 1 (614a). In (1402), an LDAP server is provisioned for each user of a plurality of users. In (1404), profile information is received. In (1406), the profile information is stored in a database associated with the LDAP server. In (1408), via the LDAP server, a suggestion from the profile information is provided in response to a partial entry provided by the user to a first client associated with the user.

Some embodiments of the enhanced client 1 (630, the enhanced client 2 (640), and the clients (650a-n), and screens thereof, have been described above. In other embodiments, the client (650) may be any other client application with functionality for messaging, mail, contacts, calendaring, and/or other utilities.

In one embodiment, the enhanced client 1 (630) has been described as having the database (634) and the PAB 1 (636). In one embodiment, the information in the database (634) and the PAB 1 (636) are not identical. In one embodiment, the information in the database (634) and the PAB 1 (636) overlap with at least some identity. In one embodiment, the information in the database (634) and the PAB 1 (636) may be contained in one database with a stored indication as to the source of contact information and profile information as the database (634) or the PAB 1 (636).

In one embodiment, indications about the source for particular profile information in the PAB 1 may be stored in the PAB 1 and associated with the particular profile information.

In one embodiment, the PAB 1 (636), the PAB 1 (616a), and the PAB 1 (646) contain identical profile information after appropriate synchronization.

In one embodiment, the enhanced client 1 (630) has been described as providing the profile information of the PAB 1 (636) to the PAB 1 (616a) via the XDF sync server (612) and, in turn, serving profile information via the LDAP server 1 (614a) to the client (650). In one embodiment, the profile information from the LDAP server 1 (614a) may not come from the enhanced client 1 (630) or the enhanced client 2 (640). In one embodiment, the profile information, via the indexing engine (618a) in the platform (610), may be provided from the web application (670), the web application (660), and/or other sources that are not the enhanced client 1 (630) or the enhanced client 2 (640). The profile information may then be provided to the client (650) from the PAB 1 (616a) via the LDAP server 1 (614a).

In one embodiment, the LDAP server 1 (614a) is used to "pull" profile information from the LDAP server 1 (614a) to the client (650), as discussed above. In one embodiment, the LDAP server 1 (614a) may also be used to "push" data from the enhanced client 1 (630) and the enhanced client 2 (640). Rather than communicate with the XDF sync server (612), the enhanced client 1 (630) and the enhanced client 2 (640) communicate with and provide profile information to the LDAP server 1 (614a). The LDAP server 1 (614a) synchronizes the profile information from the enhanced client 1 (630) and the enhanced client 2 (640) with the profile information in the PAB 1 (616a).

In one embodiment, the clients (650a-n) support LDAP. In one embodiment, the clients (650a-n) may support additional or alternate standard or open communication protocols other than LDAP. In one embodiment, another standard or open communication protocol other than LDAP may be additionally or alternately implemented in the platform (610) to support communications with the clients (650a-n).

In one embodiment, the LDAP server 1 (614a) through the LDAP server N (614c) may be implemented to provide open, standard access to contact information in social networks, such as Facebook, Myspace, and Linked-In.

Figure 16:
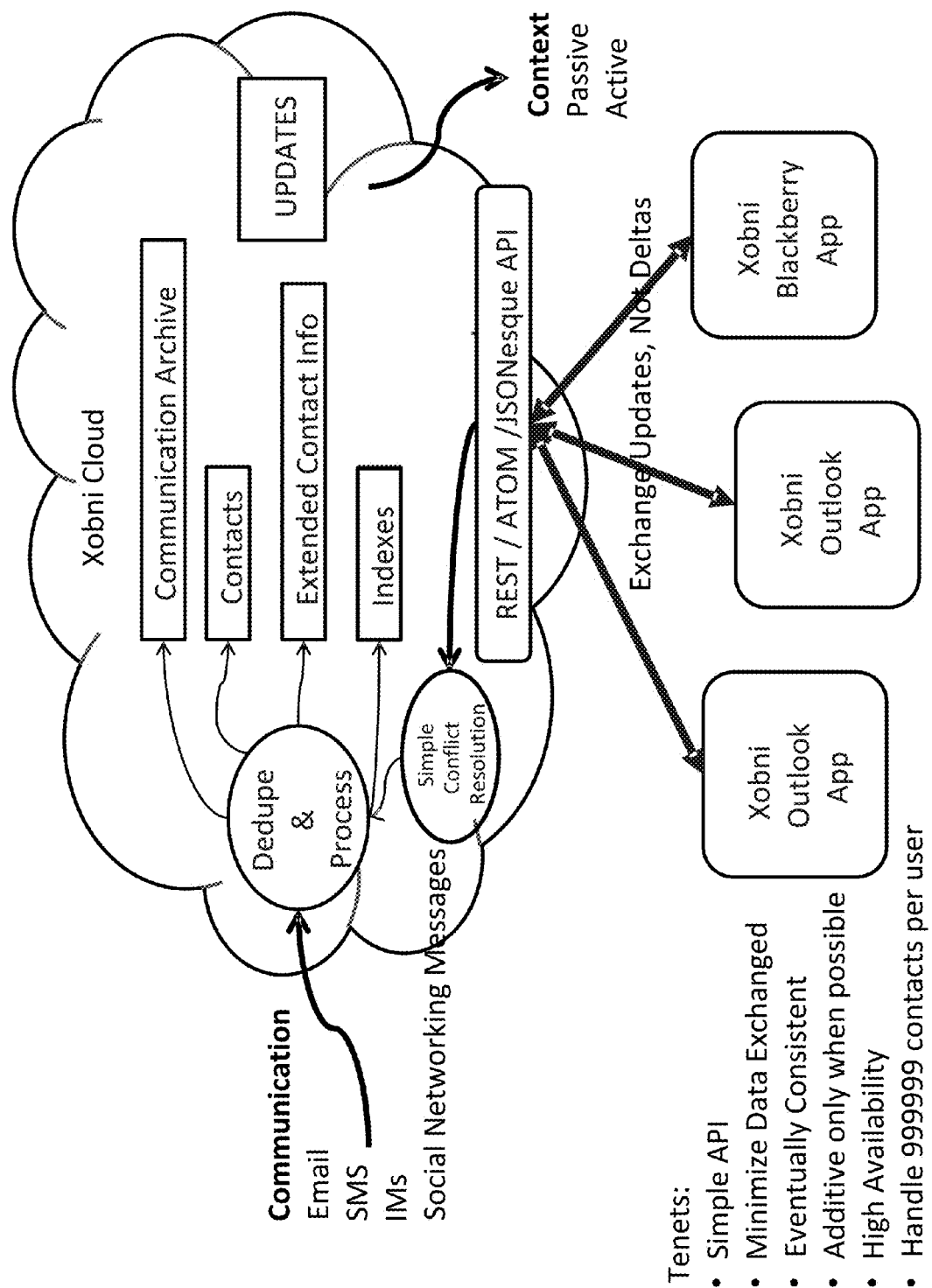
FIG. 16 illustrates a server-client system for profile processing.

FIG. 16 illustrates a server-client system for profile processing.

In one embodiment, the cloud/server will generate profile data (e.g., in a way like the profile builder (119)) and synchronize data among different clients connected to the cloud/server. Changes made in one application can be propagated to other clients via the cloud/server. Different clients may be associated with communication clients connected to different message servers (e.g., one for work email and one for personal email). The cloud/server will bridge the data and/or message content among different devices using the clients using a same account.

Some embodiments include additional new features related to a cloud concept as discussed below.

One embodiment includes a new way to reconcile changes made on different devices. For example, instead of asking the user to make a choice to resolve the conflicts, a cloud/server may accept all changes. The ranks will be used to present the most relevant one first. Thus, no information is lost; and the user is not burdened with requests to resolve conflicts, which provides a better user experience.

In one embodiment, the ranks (e.g., in a way similar to the profile presenter (125) ranking persons and/or contacts) are dependent on the devices used and/or the geographical location of the current device. Thus, the same list of contacts may be sorted differently, based on the relevancy to the particular device used to access the list and/or the current location of the device used to access the list.

In one embodiment, the ranks are provided as a function to cut down data exchange between the server and clients. The parameters for the functions are communicated from the server to the clients to allow the clients to compute the ranks based on the parameters, instead of having to obtain the updated ranks. The function may be dependent on the parameters such as time, whether a message has been read or not, the level of contact in a social network.

In one embodiment, each contact has a set of values for the parameters; when a new message is processed, the parameters of the contacts relevant to the message are updated and pushed to the client; and when ranks are needed, the client computes the ranks based on the values stored locally on the device. In one example, the rank of one contact is dependent on not only the values of the parameters for this particular contact, but also the values of the parameters for other contacts (i.e., the change in one contact can impact the ranks for a set of contacts; and when the number of parameters is smaller than the number of contacts affected, transmitting the parameters involves less data communications than transmitting the updated ranks). In another example, time-based ranking is performed, in which the formula for ranking may be a function of the time since the last message received. If the client relies upon the server to generate these values, every time it asks for "rank updates" the server would have to send back the entire set of ranks for every person assuming time had progressed since the last update requested. To reduce the data traffic, the parameters for the time-based formula can be transmitted to the client; and the client can re-evaluate the ranks based on the parameters and the formula at different time instances without having to download the entire set of ranks from the cloud/server.

In one embodiment, the clients retrieve the messages from the message servers then sent to the profile builder on the cloud servers for processing. For example, the clients may forward a copy of the message to the profile builder on the server to generate and update the profile set. In another embodiment, the Cloud Servers themselves can fetch directly from the message servers. In another example, the user terminal may be configured to use the server to get the messages and then used the client to get the messages from the server.

Figure 15:
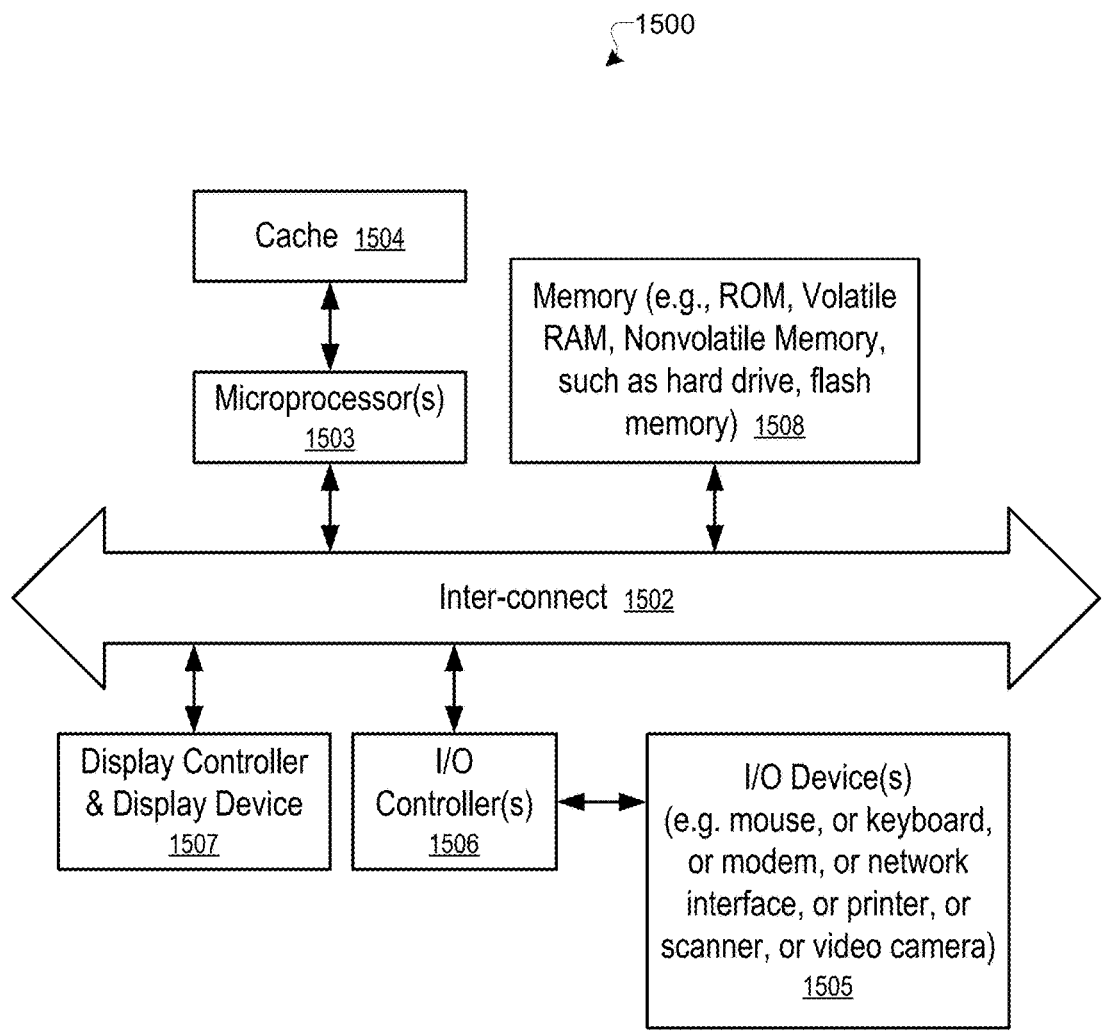
FIG. 15 shows a data processing system, which can be used in various embodiments.

FIG. 15 shows a data processing system, which can be used in various embodiments. While FIG. 15 illustrates various components of a computer system, it is not intended to represent any particular architecture or manner of interconnecting the components. Some embodiments may use other systems that have fewer or more components than those shown in FIG. 15.

In one embodiment, the user terminal (101) can be implemented as a data processing system, with fewer or more components, as illustrated in FIG. 15. When one or more components of the user terminal (101) are implemented on one or more remote servers, the servers can be implemented as a data processing system, with fewer or more components, as illustrated in FIG. 15.

In FIG. 15, the data processing system (1501) includes an inter-connect (1502) (e.g., bus and system core logic), which interconnects a microprocessor(s) (1503) and memory (1508). The microprocessor (1503) is coupled to cache memory (1504) in the example of FIG. 15.

The inter-connect (1502) interconnects the microprocessor(s) (1503) and the memory (1508) together and also interconnects them to a display controller, display device (1507), and to peripheral devices such as input/output (I/O) devices (1505) through an input/output controller(s) (1506).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (1502) may include one or more buses connected to one another through various bridges, controllers and/or adapters. In one embodiment, the I/O controller (1506) includes a USB (Universal Serial Bus) adapter for controlling USB peripherals, and/or an IEEE-1394 bus adapter for controlling IEEE-1394 peripherals.

The memory (1508) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   generating, on a server platform, profile data for each of a plurality of users including a first user, the profile data related to contacts used in messages to and from each respective user of the plurality of users;
   generating, via the server platform, parameters corresponding to the profile data of the first user for ranking the contacts of the first user, wherein the ranking is based on giving different weights to different types of fields in the profile data;
   transmitting, from the server platform, the parameters to a plurality of client devices of the first user for storage locally on each client device to allow each client device to compute ranks for at least a portion of the contacts of the first user based on a function that uses the parameters, wherein the client devices include a first client device and a second client device, wherein the rank for a contact computed by the first client device is different from the rank computed for the contact by the second client device, and wherein the rank computed by each of the plurality of client devices is further dependent on a geographic location of the device that is computing the rank;
   in response to receiving a new message to the first user, updating the parameters for contacts relevant to the new message, and transmitting the updated parameters to the plurality of client devices; and
   synchronizing the profile data among the plurality of client devices, the synchronizing comprising reconciling changes made on different devices using a plurality of ranks for the contacts of the first user, wherein each of the plurality of ranks is computed by a respective one of the plurality of client devices of the first user using the updated parameters.

2. The method of claim 1, wherein the reconciling changes made on different devices comprises accepting all changes for a first contact and presenting the most relevant change first to the first user based on a rank of the first contact computed by the first client device.

3. The method of claim 1, wherein the generated parameters include a parameter indicating a level of contact in a social network.

4. The method of claim 1, further comprising processing, by the server platform, the new message to the first user for updating the profile data for a contact of the first user.

5. The method of claim 4, wherein the new message is received by the server platform from the first client device.

6. The method of claim 4, wherein the new message is received by the server platform from a messaging server.

7. The method of claim 1, further comprising extracting, over a network, a portion of the profile data from a separate web application of a remote server.

8. A non-transitory machine readable media embodying instructions, the instructions causing a system to:
   generate, on a server platform, profile data for each of a plurality of users including a first user, the profile data related to contacts used in messages to and from the plurality of users;
   generate, via the server platform, parameters corresponding to the profile data of the first user for ranking the contacts of the first user, wherein the ranking is based on giving different weights to different types of fields in the profile data;
   transmit, from the server platform, the parameters to a plurality of client devices of the first user for storage locally on each client device to allow each client device to compute ranks for at least a portion of the contacts of the first user based on a function that uses the parameters, wherein the client devices include a first client device and a second client device, wherein the rank for a contact computed by the first client device is different from the rank for the contact computed by the second client device, and wherein the rank computed by each of the plurality of client devices is further dependent on a geographic location of the device that is computing the rank;
   in response to receiving a new message to the first user, update the parameters for contacts relevant to the new message, and transmit the updated parameters to the plurality of client devices; and
   synchronize the profile data among the plurality of client devices, the synchronizing comprising reconciling changes made on different devices using a plurality of ranks for the contacts of the first user, wherein each of the plurality of ranks is computed by a respective one of the plurality of client devices of the first user using the updated parameters.

9. The machine readable media of claim 8, wherein the reconciling changes made on different devices comprises accepting all changes for a first contact and presenting the most relevant change to the first user based on a rank of the first contact.

10. The machine readable media of claim 8, wherein the generated parameters include a parameter indicating a level of contact in a social network.

11. The machine readable media of claim 8, wherein the instructions further cause the system to process the new message to the first user for updating the profile data for a contact of the first user.

12. The machine readable media of claim 11, wherein the new message is received by the server platform from the first client device.

13. A system, comprising:
    at least one processor; and memory storing instructions configured to instruct the at least one processor to:

generate profile data for each of a plurality of users including a first user, the profile data related to contacts used in messages to and from each respective user of the plurality of users;

generate parameters corresponding to the profile data of the first user for ranking the contacts of the first user, wherein the ranking is based on giving different weights to different types of fields in the profile data;

transmit the parameters to a plurality of client devices of the first user for storage locally on each client device to allow each client device to compute ranks for at least a portion of the contacts of the first user based on a function that uses the parameters, wherein the client devices include a first client device and a second client device, wherein the rank for a contact computed by the first client device is different from the rank for the contact computed by the second client device, and wherein the rank computed by each of the plurality of client devices is further dependent on a geographic location of the device that is computing the rank;

in response to receiving a new message to the first user, update the parameters for contacts relevant to the new message, and transmit the updated parameters to the plurality of client devices; and synchronize the profile data among the plurality of client devices, the synchronizing comprising reconciling changes made on different devices using a plurality of ranks for the contacts of the first user, wherein each of the plurality of ranks is computed by a respective one of the plurality of client devices of the first user using the updated parameters.

14. The system of claim 13, wherein the instructions are further configured to instruct the at least one processor to process the new message to the first user for updating the profile data for a contact of the first user, wherein the new message is received from a messaging server.

15. The system of claim 13, wherein the instructions are further configured to instruct the at least one processor to extract, over a network, a portion of the profile data from a separate web application.

16. The system of claim 13, wherein the reconciling changes made on different devices comprises accepting all changes for a first contact and presenting the most relevant change to the first user based on a rank of the first contact computed by the first client device.

17. The system of claim 13, wherein the generated parameters include a parameter indicating level of contact in a social network of the first user.

* * * * *